United States Patent
Volkovs

(10) Patent No.: US 8,542,832 B2
(45) Date of Patent: Sep. 24, 2013

(54) SYSTEM AND METHOD FOR THE CALCULATION OF A POLYNOMIAL-BASED HASH FUNCTION AND THE ERINDALE-PLUS HASHING ALGORITHM

(76) Inventor: Nikolajs Volkovs, Toronto (CA)

(*) Notice: Subject to any disclaimer, the term of this patent is extended or adjusted under 35 U.S.C. 154(b) by 68 days.

(21) Appl. No.: 13/057,030

(22) PCT Filed: Jul. 31, 2009

(86) PCT No.: PCT/CA2009/001093
§ 371 (c)(1),
(2), (4) Date: May 2, 2011

(87) PCT Pub. No.: WO2010/012109
PCT Pub. Date: Feb. 4, 2010

(65) Prior Publication Data
US 2011/0211697 A1    Sep. 1, 2011

Related U.S. Application Data

(60) Provisional application No. 61/085,659, filed on Aug. 1, 2008.

(51) Int. Cl.
*H04K 1/00* (2006.01)
*H04L 29/06* (2006.01)
*H04L 9/32* (2006.01)

(52) U.S. Cl.
USPC .............................. 380/255; 380/28; 713/168

(58) Field of Classification Search
None
See application file for complete search history.

(56) References Cited

U.S. PATENT DOCUMENTS

| | | | | |
|---|---|---|---|---|
| 4,588,985 A | * | 5/1986 | Carter et al. | 341/95 |
| 5,625,692 A | * | 4/1997 | Herzberg et al. | 380/286 |
| 5,920,900 A | * | 7/1999 | Poole et al. | 711/216 |
| 2003/0021411 A1 | * | 1/2003 | Seroussi et al. | 380/46 |
| 2004/0103286 A1 | * | 5/2004 | Geiringer et al. | 713/181 |
| 2006/0050870 A1 | * | 3/2006 | Kimmel et al. | 380/30 |

FOREIGN PATENT DOCUMENTS

CA    2546148 A1 * 11/2007

OTHER PUBLICATIONS

Hanson, MIT Scheme Reference: Bit Strings, Jun. 17, 2002, pp. 1-5, retrieved from http://www.cse.iitb.ac.in/~as/mit-scheme/scheme_10.html.*

(Continued)

*Primary Examiner* — Kaveh Abrishamkar
*Assistant Examiner* — James J Wilcox
(74) *Attorney, Agent, or Firm* — Timothy D. Bennett; Emerson Thomson Bennett

(57) ABSTRACT

The present invention is a polynomial-based hash function involving an ERINDALE-PLUS hashing algorithm. The function may involve several elements, including splitting with jumping, masking and bit string generation which generally involves representing an initial sequence of bits as a specially constructed set of polynomials. The means of achieving the function may involve methods that achieve improved speeds, such as requirements related to the size of the bit strings to cause the bit strings to be compatible with splitting and jumping and to involve iterated masking of a degree greater than 0. Additionally the function may involve recursive padding methods and a construction of MAC for considered hash function. The sum of the elements of the present invention is the provision of enhanced security as well as improved speed of processing for messages. Thus, messages processed by way of the present invention may be less prone to attack.

21 Claims, 2 Drawing Sheets

(56) References Cited

OTHER PUBLICATIONS

Shalev, Split-Ordered Lists: Lock-Free Extensible Hash Tables, Tel-Aviv University, Tel-Aviv Israel, Journal of the ACM, vol. 53, No. 3, May 2006, pp. 379-405.*

Haramoto, "A Fast Jump Ahead Algorithm for Linear Recurrences in a Polynomial Space," Dept. of Math, Hiroshima University, Japan, Departement d'Informatique et de Recherche Operationnelle, Universite' de Montreal, Montreal, Canada, 2008, pp. 1-9.*

* cited by examiner

SYSTEM AND METHOD FOR THE CALCULATION OF A POLYNOMIAL-BASED HASH FUNCTION AND THE ERINDALE-PLUS HASHING ALGORITHM

FIELD OF INVENTION

The present invention relates to a polynomial-based hash function and an ERINDALE-PLUS hashing algorithm to achieve optimum processing speed and enhanced security.

BACKGROUND OF THE INVENTION

Hash and Message Authentication Code (or MAC) algorithms are extremely important and, at the same time, the most vulnerable components of network security. These algorithms are used to provide a hash or MAC value that can serve as authentication of the integrity of a message that they have been appended to. A recipient user can perform the same hash or MAC operation on the received data to obtain a hash or MAC value and to compare it with appended value in order to verify that the data has not been modified in transit. It should be noted that because hash and MAC algorithms produce tags of a fixed size for inputs of all lengths, the mapping is a many-to-one mapping, which results in "hash collisions". Hash collisions result when two different messages have the same hash or MAC value. The design of the algorithms is intended to generate widely divergent hash or MAC values for slightly different inputs which provide an ease of recognizing of message alteration.

A typical secure hash function is generally referred to as an iterated hash function and is based on a proposal by Merkle (R. C. Merkle, Authentication and Public Key systems, Ph. D. Thesis, Stanford University, June 1979, and R. C. Merkle, One way hash functions and DES, in: Advances in Cryptology—Crypto '89, ed. Brassard, pp. 428-446, Lecture Notes in Computer Science 435, Springer-Verlag, 1990). According to Merkle's proposal, the hash function takes an input string of bits and partitions the string into fixed-sized blocks of size k. Then a compression function takes k bits of the $i^{th}$ partition and m bits from the previous calculation and calculates m bits of the $(i+1)^{st}$ iteration. The output value of the last iteration (of size m) is the hash value. One common hash function is Message-Digest algorithm 5 (MD5) which generates 128-bit hash values. Flaws were identified in the MD5 algorithm in 1996, leading many organizations to suggest that MD5 may not be relied upon as secure.

The secure hash function SHA was designed by the National Security Agency (NSA) and issued by the National Institute of Standards and Technology (NIST) in 1993 as a Federal Information Standard (FIPS-180). A revised version called SHA-1, which specifies an additional round to the message expansion, was later issued in 1995 as FIPS-180-1. Further revisions to the SHA family of algorithms include SHA-224, SHA-256, SHA-384, and SHA-512 which are occasionally collectively referred to as SHA-2.

SHA-1 produces a 160-bit hash. That is, every message hashes down to a 160-bit string. Given that there are an infinite number of messages that hash to each possible value, there are an infinite number of possible collisions. But because the number of possible hashes is so large, the odds of finding a collision by chance is small (one in $2^{80}$ to be exact). Thus, using the brute-force method of finding collisions, the success of the attack depends solely on the length of the hash value.

In 2005 Prof. Xiaoyung Wang announced an attack on the NIST SHA-1 hash function and discovered that SHA-1 can be broken. In the same year she created a collision for the MD5 hash function. Prof. Wang's work revealed the vulnerabilities of the two hash functions most widely utilized by industries today. This revelation compelled the NIST to take steps to transition rapidly to the stronger SHA-2 family of hash functions.

By the recommendation of NIST, SHA-1 has been replaced by SHA-256, SHA-384, and SHA-512 (Secure Hash Signature Standard (SHS) (FIPS PUB 180-2)). However, as the algorithms SHA-1, SHA-256, SHA-384, and SHA-512 have common constructions, the same attack that has already been used in the case of SHA-1, can be applied to SHA-256, SHA-384, and SHA-512. Furthermore, there is no guarantee that the attack will not be further enhanced. Hence, all the systems of the SHA family may eventually be compromised.

When a MAC or hashing algorithm is compromised, the conventional recommendation is to abandon the algorithm and move to a more secure algorithm. This requires that electronic infrastructure used to generate the hash or MAC values be updated, which involves moving a large installed base to another system. For obvious reasons, including user inertia, this is a difficult task. Thus, there is a need for methods, computer programs and computer systems that, while utilizing hash and MAC algorithms (such as the MAC algorithms of the SHA family), are operable to provide an improved level of security. There is a further need for the methods, computer programs and computer systems that meet the aforesaid criteria and are further easy to implement to existing technologies and are computationally feasible.

Canadian Patent Application No. 2,546,148 disclose a secure hashing method consisting of: (1) representing an initial sequence of bits as a specially constructed set of polynomials as described herein, (2) transformation of this set by masking, (3) partitioning the transformed set of polynomials into a plurality of classes, (4) forming the bit string during the partitioning, (5) for each of the plurality of classes, factoring each of the polynomials and, so as to define a set of irreducible polynomials, collecting these factors in registers defined for each of the plurality of classes, (6) wrapping the values of the registers from the plurality of classes by means of an enumeration, (7) organizing the enumerations and the bit strings into a knapsack, and, finally, (8) performing an exponentiation in a group to obtain the hash value or the MAC value.

Because of the polynomial representation and masking transformation, in order to create a collision in accordance with the secure hash function described above, an attacker would be required to solve a collection of systems of non-linear iterated exponential equations over a finite field having specific constraints. In the case of a MAC, this difficulty is combined with the difficulty of opening the knapsack, and the difficulty of solving (a) the elliptic curve discrete logarithm referred to below, or (b) the discrete logarithm problem in the finite group, which further contributes to the security of the method of the present invention. As a result of the structure of the procedure, the resulting hash or MAC value has the following important attributes:
a) the length of the output can be changed simply by changing the final step;
b) the computation is a bit-stream procedure as opposed to a block procedure;
c) creating a collision requires the solution to several difficult mathematical problems; and
d) varying some parameters (the number of the bit strings, or the length of the bit strings, for example) allows easy variation of the difficulty of creating a collision.

SUMMARY OF THE INVENTION

In one aspect the invention is a system directed at hash functions capable of averting attacks upon messages characterized in that it comprises: at least one computer; a message sent by a sender by way of the at least one computer; one or more polynomial-based hashing functions being operable by the at least one computer for application to the message to produce a hash output, utilizing one or more of the following elements: a splitting with jumping function; a masking function; a bit string generation function; and a padding function; one or more processing functions operable to generate an output that averts attacks upon the message; and wherein attacks upon the security of the message are averted through the application of the one or more polynomial-based hash functions and the one or more processing functions to the message.

In another aspect the invention is a method of application of a polynomial-based hash function to a message sent by a user from a computer, characterized in that it comprises the following steps: calculating a hash output utilizing the polynomial-based hash function by one or more of the following steps: applying a splitting with jumping function to the message to generate splitting with jumping outputs; applying a masking function to the splitting with jumping outputs to generate masking outputs; applying a bit string generation function to the masking outputs to generate bit strings outputs; and applying a padding function to the bit strings outputs to generate padding outputs; processing the padding outputs by one or more processing functions operable to generate a set of polynomials; performing the incorporation of the set of polynomials with the message to generate an output that averts attacks upon the security of the message.

In yet another aspect the invention is a computer system characterized in that it comprises software to program existing computer hardware to: receive a message sent by a sender; apply one or more polynomial-based hashing functions to the message to produce a hash output, utilizing one or more of the following elements: a splitting with jumping function; a masking function; a bit string generation function; and a padding function; process the hash output by one or more processing functions operable to generate an output that averts attacks upon the security of the message.

In still another aspect the invention is polynomial-based hash function operable by way of a computer program including computer instructions operable to averting attacks upon a message sent by a sender characterized in that it comprises: one or more of the following elements to produce a hash output, each facilitating a parameterized inner structure: a splitting with jumping function; a masking function; a bit string generation function; and a padding function; one or more processing functions operable to generate an output that averts attacks upon the security of the message.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
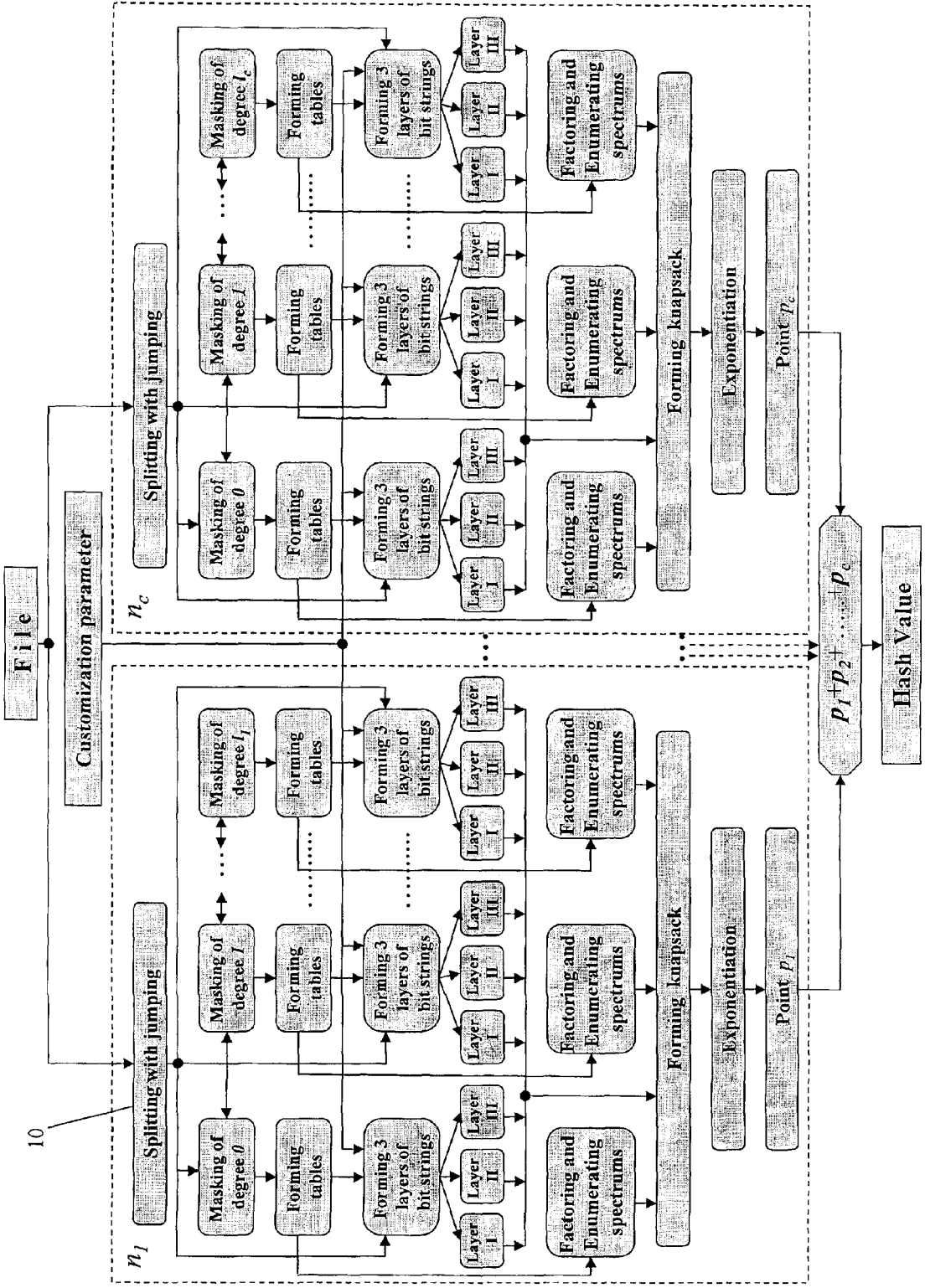
FIG. 1 is a flow chart of the hashing algorithm of the present invention.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a polynomial-based hash function involving an ERINDALE-PLUS hashing algorithm. The invention may provide a secure means of transferring a message capable of functioning at a significant speed. The function can involve several elements, including splitting with jumping, masking and bit string generation which generally involves representing an initial sequence of bits as a specially constructed set of polynomials. The means of achieving the function involves methods that achieve improved speeds, such as requirements related to the size of the bit strings to cause the bit strings to be compatible with splitting and jumping and to involve iterated masking of a degree greater than 0. Additionally the function involves recursive padding methods and a construction of MAC for considered hash function. A paradigm of generating a lot of polynomial based hash functions with different inner structure, which was named the customization of the hash function is further applied. Hash values (or secure hash values) of the messages processed by way of the present invention are protected and less prone to attack.

MAC construction is generally applied for secure hashing, namely hashing that involves a key. The present invention may provide a method of secure hashing that does not apply a MAC construction. In the present invention, the parameter that sets certain structures of the hashing algorithms can be used as a key. This is described below in reference to the ERINDALE and ERINDALE-PLUS hash algorithms. Such algorithms incorporate changeable or parameterized inner structures.

The present invention involves a method of processing the whole of a message file which results in faster and more secure processing. In particular, this processing involves procedures of splitting with jumping, masking, and bit string and table creation that are more powerful than those applied in the prior art. The present invention may provide a benefit over the prior art in that although a splitting step is known in the prior art, the present invention applies a splitting with jumping procedure.

The present invention offers additional benefits over the prior art as well. When a MAC or hashing algorithm is compromised, the conventional prior art recommendation is to abandon the algorithm and move to a more secure algorithm. This requires that the electronic infrastructure being used for generation of the hash or MAC values to be updated. This can involves moving a large installed base to another system with the larger size of a hash or MAC value. For several reasons, such as, for example user inertia, this is a difficult task. The present invention provides a method, computer program and system that may be operable to provide an improved level of security for any size of a hash value while utilizing hash and MAC (secure hashing) algorithms. Additionally, the present invention may be easily implemented to existing technologies and computationally feasible.

Another benefit of the present invention over the prior art is that it may construct one hashing algorithm with a changeable inner structure. When a hashing scheme becomes vulnerable it may be necessary to alter the algorithm. The present invention offers the possibility to enhance the security of the algorithm by changing certain parameters. The prior art does not provide this option. The present invention may facilitate enhancement of the inner structure of the algorithm and the result obtained may be a new more secure variant of the hash function. In such an embodiment of the present invention it may not be necessary to construct a new algorithm. Both the ERINDALE algorithm and ERINDALE-PLUS algorithm presented in this application facilitate such security enhancing by means of changing or enriching the structure of the algorithms applied by the present invention.

Using masking and iterated masking construction in ERINDALE and ERINDALE-PLUS hashing algorithms may force an adversary to solve a system of iterated exponential equations over finite fields in order to create a collision. The level of complexity of finding a solution to the system of the equations may create difficulties that an attacker cannot overcome. Layering of the bit strings of the present invention, which may incorporate multiple layers rather than the two layers of the prior art, can create further difficulties for attackers. Each layer and dimension of the bit string procedure adds to the overall security of the present invention.

Prior art examples can be characterized as having a limited and narrow application to specific applications. The present invention may have a wider and more general application.

In one embodiment of the present invention, due to the specific procedures of splitting with jumping, masking and bit string and table creation utilized by the present invention to process the whole of a message file, elements of the hashing function may be tailored. For example, the polynomial-based hashing algorithm applied may be the ERINDALE-PLUS hashing algorithm which is applied to function in accordance with the present invention method.

The present invention offers further benefits over the prior art in that it is convenient for hardware implementation. The ERINDALE-PLUS algorithm may be parameterized more effectively than algorithms of the prior art. Additionally, the ERINDALE-PLUS algorithm may not require as much memory as the algorithms applied in the prior art.

Dedicated hardware elements, including custom Application Specific Integrated Circuits (ASIC) and digital signal processors (DSP), can be used in the implementation of the present invention. Alternatively, a general purpose computer can be programmed to execute the methods of the present invention.

Figure 2:
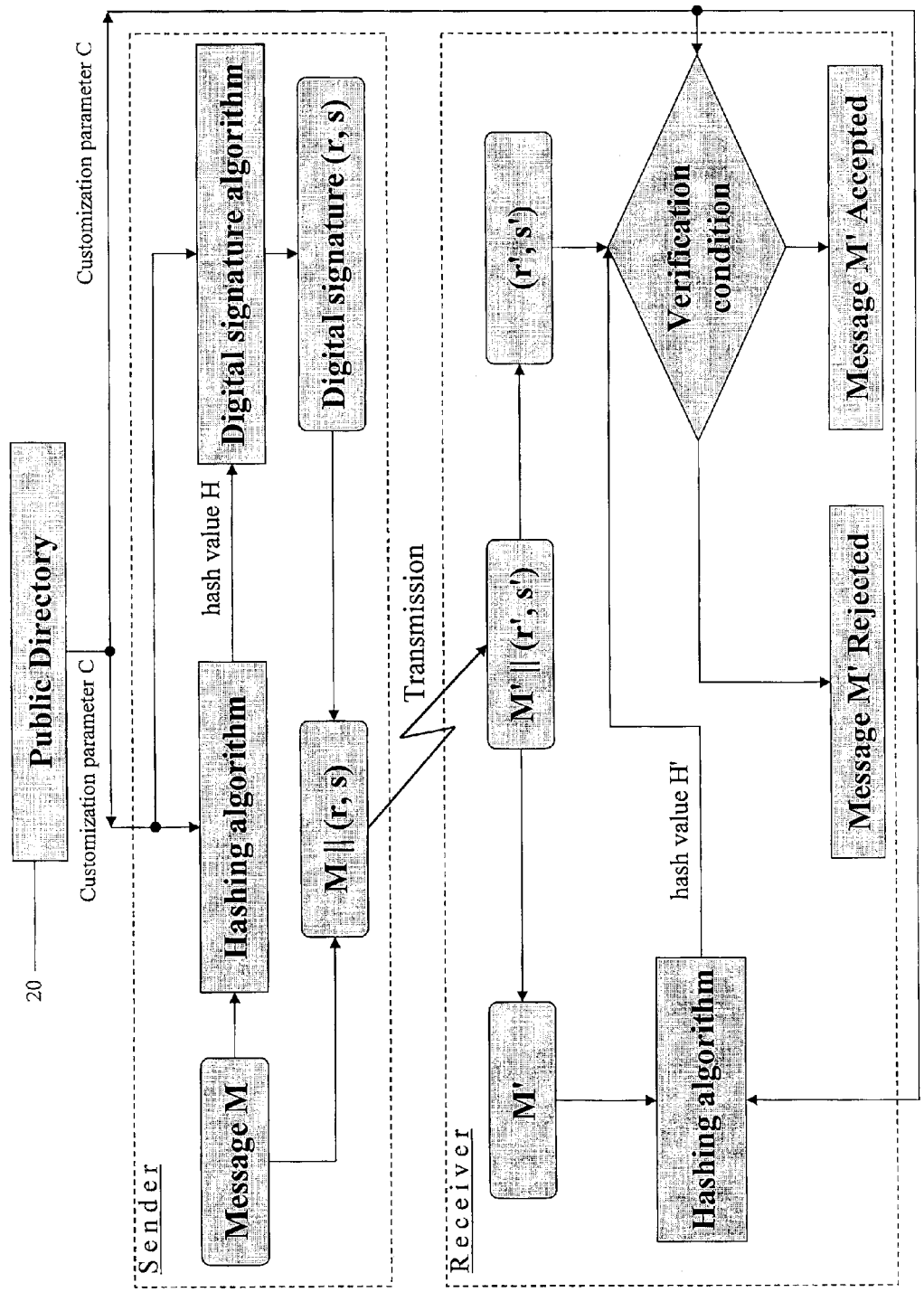
FIG. 2 is a flow chart of the digital signature scheme of the present invention.

Embodiments of the present invention may include the hashing algorithm, as shown in FIG. 1, or the digital signature scheme, as shown in FIG. 2. These are detailed below. However, a skilled reader reader will recognize that embodiments of the present invention may include variations of these steps.

Multiple Splitting with Jumping

In one embodiment of the present invention a method of splitting a file into a collection of polynomials of certain degree may be undertaken. The splitting implemented may allow for a variation in the speed of the algorithm function.

Prior art methods of splitting may be referred to as 0-jumping splitting because there is no gap between any two neighboring elements in the direct or forward splitting.

In an embodiment of the present invention the splitting procedure may be as follows: A number may be fixed, such as n. The splitting described herein will be referenced as q-jumping splitting for any $0 < q < n$. The description will be restricted to direct q-splitting however, the construction for backward q-splitting is analogous to this procedure.

To perform a jumping with 2-jumping splitting we construct:

$$M(1,n), M(3,n+2), M(5,n+4), M(7,n+6), M(9,n+8), \ldots, \qquad (1)$$

Note that for $q=2$ the above collection can be written as follows $$M(1,n), M(1+q,n+(q)), M(1+2q,n+2(q)), M(1+3q,n+3(q)), M(1+4q,n+4(q)), \ldots \qquad (2)$$

A general construction for any $0 < q < n$ may be applied through the construction of the following collection:

$$M(1,n), M(1+q,n+(q)), M(1+2q,n+2(q)), M(1+3q,n+3(q)), \ldots \qquad (3)$$

Splitting with jumping may then be defined as the collection of elements $$M(1+q_1,n+q_1), M(1+q_1+q_2,n+(q_1+q_2)), M(1+q_1+q_2+q_3,n+(q_1+q_2+q_3)), \ldots, \qquad (4)$$

where $0 \leq q_i < n$ and the numbers $q_i$ are defined in accordance with certain algorithms. Two groups of such algorithms may be Group 1 or Group 2 described below. A skilled reader will recognize that other algorithms may be applied.

Group I

In one embodiment of the present invention an algorithm for forming $q_i$ where $q_i$ may depend on just one or a few elements $M(j, j+n-1)$ for $j \leq i$, $i=1, \ldots, k$.

In general, a mapping $$\phi: \{0,1,\ldots,2^n-1\} \to \{0,1,\ldots,n-1\} \qquad (5)$$

may be formed and set $$q_i = \phi(\psi_d(M(j_1,j_1+n-1), M(j_2,j_2+n-1), \ldots, M(j_l,j_l+n-1))),$$

where $\psi_d$, in turn is an d-placed function $$\psi_d: \{0,1,\ldots,2^n-1\} \times \ldots \times \{0,1,\ldots,2^n-1\} \to \{0,1,\ldots,2^n-1\}, \qquad (6)$$

where $0 < d < i$.

For instance, it is possible to set $q_1 = 0$ and $$q_i = int(M(i,i+n-1) \bmod n,$$

$i > 0$, or $$q_i = int(M(i-1,i+n-2) \oplus M(i-2,i+n-3) \oplus \ldots \oplus M(i-d,i-d+n-1)) \bmod n \qquad (8)$$

for the corresponding $i > d > 1$.

Group II

In another embodiment of the present invention the second group may consist of algorithms for forming $q_i$, in a framework in which $q_i$ may depend either on one or a few elements $M(j, j+n-1)$, and possibly one or a few elements $CUR_j$, where $j \leq i$, $i=1, \ldots, k$. Separately, it is possible to consider the situation when $q_i$ depends on just one or a few elements $CUR_j$ for $j \leq i$, $i=1, \ldots, k$.

Examples of realizing the function $\psi_d$ in this case for different $d > 1$ are provided.

Setting $q_1 = 0$ and $$q_i = \#_1(M(i-1,i+n-2)),$$

where $i > 0$, $\#_1 (M(i-1, i+n-2)$ denotes the number of 1-s in a sequence $M(i-1, i+n-2)$ is one such example. In another example it is possible to set $q_i = 0$ for $i < d$ and then calculate $$\omega_i^d = M(i-1,i+n-2) \oplus CUR_{i-2} \oplus CUR_{i-3}^{(*)} \oplus \oplus CUR_{(i-4)}^{(**)} \oplus \ldots \oplus CUR_{i-d+2y}^{(*,\ldots,*)}$$

where $CUR_{i-3}^{(*)}$, $CUR_{i-4}^{(**)}$, ..., $CUR_{i-d+2}^{(*,\ldots,*)}$ are the elements of the iterated masking of the corresponding degrees. In general, any function defined on the collection of elements $$M(i-1,i+n-2), CUR_{i-2}, CUR_{i-3}^{(*)}, CUR_{i-4}^{(**)}, \ldots, CUR_{(i-d+2)}^{(*,\ldots,*)}$$

or some subsets of the collection can be considered. Note that the last element is of degree d.

Then using a mapping $$\phi:\{0,1,\ldots,2^n-1\} \to \{0,1,\ldots,n\} \quad (9)$$

it is possible to obtain $$q_i = \phi(int(\omega_i))$$

for i=l+1, ..., k.

In embodiments of the present invention, by choosing different mappings $\phi$, it may be possible to change the processing speed for a message M. Indeed, assume that n=4 and consider two tables, by means of which we define two mappings, say $\phi_1$ and $\phi_2$.

TABLE 1

Function $\phi_1$.

| x: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $\phi_1$: | 1 | 0 | 1 | 0 | 2 | 1 | 3 | 2 | 1 | 0 | 2 | 1 | 3 | 1 | 0 | 2 |

TABLE 2

Function $\phi_2$.

| x: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $\phi_2$: | 2 | 3 | 1 | 2 | 3 | 0 | 1 | 3 | 2 | 3 | 2 | 1 | 2 | 3 | 2 | 3 |

The value may be defined as $$ds(\varphi, n) = 1/2^n \sum_{x=0}^{2^n-1} \varphi(x)$$

which may be called the jumping bit distance of a mapping $\phi$. Thus, $ds(\phi_1, 4) = 1.25$, while
$ds(\phi_2, 4) = 2.065$.

The larger the jumping bit distance, the faster it may process a message, since the number of elements processed during splitting with the mapping $\phi$ is, on average equal to $k/ds(\phi, n)$.

Thus, by varying n and $\phi$, it is possible to change the speed of the splitting procedure and therefore the speed of the function. However, by increasing the jumping bit distance, we do not process a message as "thoroughly" as we would with a smaller jumping bit distance. The best way of defining a mapping $\phi$ is to construct a random sequence of $2^n$ elements $\{x_1, \ldots, x_{2^n}\}$, where $0 \leq x_1 < n-1$, i=1, ..., $2^n$.

Iterated Masking Construction
Requirements for Using Fields and Generators

In one embodiment of the present invention a construction of the iterated masking and specific requirements to the generators and the corresponding fields that are used in the construction, sufficiently improve the security of the function, as the relation between $M_i$ and $CUR_i$ become difficult to examine.

In one embodiment of the present invention, a first step of construction may be to calculate $CUR^{n_j}$ using generators $\delta$ and $\beta$ of the corresponding fields $GF_1(2^{n_j})$ and $GF_2(2^{n_j})$. The fields $GF_1(2^{n_j})$ and $GF_2(2^{n_j})$ are generated in a standard way based on generators $\delta$ and $\beta$ modulo different irreducible polynomials f and g respectively. After calculating $CUR_i^{n_j}$, it may be possible to compute $CUR_i^{n_j*}$ for i=1, ..., k using the same generators $\delta$ and $\beta$.

When calculating the sequence $CUR_i^{n_j*}$ based on the sequence $CUR_i^{n_j}$, generators $\delta_1$ and $\beta_1$ which are different from $\delta$ and $\beta$ may be used. Moreover, in this case, irreducible polynomials $f_1 \neq f$ and $g_1 \neq g$ may be applied for generating the corresponding fields.

Moreover, calculating the iterated masking of degree, say, m, may use generators $\delta_m$ and $\beta_m$ that are different from the previously-indexed generators $\delta_{m-1}$ and $\beta_{m-1}$ that were applied for computing the polynomials of the iterated masking of degree m−1.

It is possible to further assume that $f_{m-1}$ and $g_{m-1}$ are the irreducible polynomials of degree $n_j$ from which the fields $GF_1(2^{n_j})_{m-1}$ and $GF_2(2^{n_j})_{m-1}$ may be generated with generators $\delta_{m-1}$ and $\beta_{m-1}$, correspondingly.

Calculating the elements of the iterated masking of degree m, may use the fields $GF_1(2^{n_j})_m$ and $GF_2(2^{n_j})_m$ that are generated, respectively, modulo irreducible polynomials $f_m$ and $g_m$ of degree $n_j$ such that $f_m \neq f_{m-1}$ and $g_m \neq g_{m-1}$.

All generators $\delta, \delta_1, \ldots, \delta_m$ and $\beta, \beta_1, \ldots, \beta_m$ may be irreducible.

CUR Calculation I

In one embodiment of the present invention the multiple masking procedure overcomes the prior art in that it alters the formula for calculating the sequences $CUR^{n_j}$, j=1, ..., c.

In one embodiment of the present invention, the formula for calculating the elements of CUR may begin with the fixing of some $n_j$, omit the upper index $n_j$ for $CUR^{n_j}$, and simply write CUR.

It is possible to apply the CUR expression for i=1, ..., $2^n+1$, however, the formula for the calculation of elements of CUR for $i \leq 2^n+2$ should consider any $p_1(i), p_2(i)$ such that $1 < p_1(i) \leq 2^n$ and $1 < p_2(i) \leq 2^n$. We have $$CUR_i = M_i \oplus \phi_f \left( \delta^{\left( int(M_{i-1}) + int\left(CUR_{d_1^0}\right) mod 2^n \right)} \right) \oplus \phi_g \left( \beta^{\left( int(CUR_{i-1}) + int\left(CUR_{d_2^0}\right) mod 2^n \right)} \right),$$

where $$d_1^0 = d_1^0(i) = i - 2 - (int(M_{i-1})) \bmod p_1(i),$$

$$d_2^0 = d_2^0(i) = i - 2 - (int(CUR_{i-1})) \bmod p_2(i). \quad (10)$$

In particular, $p_1(i)$ may be equal to $p_1(j)$ and $p_2(i)$ may be equal to $p_2(j)$ for i, $j \geq 2^n+2$ and $i \neq j$.

It is possible to define $p_1(i)$ and $p_2(i)$ in different ways for $i \geq 2^n+2$.

For instance, assume that the iterated masking of degree 1 is constructed. In this case, using the indexation for the corresponding iterated degree, for $CUR^0$ and for $i \geq 2^n+2$ it is possible to set $$p_1^0(i) = int(CUR^*_{i-2-d_3^0(i)}), p_2^0(i) = int(CUR^*_{i-2-d_3^1(i)})$$

if $int(CUR^*_{i-2-d_3^0(i)})$ and $int(CUR^*_{i-2-d_3^0})$ are different from 0 and 1. Otherwise, it is possible to set $$p_1^0(i) = c_1, p_2^0(i) = c_2,$$

where $c_1$ and $c_2$ are some constants. For instance, we may set $c_1=c_2=2^n-1$.

It is also possible to define $d_3^0(i)$, $d_3^1(i)$ in different ways. For example, we may also set $$d_3^0(i)=int(CUR_{i-t_1^0}^0), d_3^0(i)=int(CUR_{i-t_2}^0)),$$

where $2 \leq t_1^0 \leq 2^n-1$, $2 \leq t_2^0 \leq 2^n-1$ are some constants, or it is possible to consider $$t_1^0=int(CUR^*_{i-2}), t_2^0=int(CUR^*_{i-3}).$$

For the case of iterated degree 1 we have $$CUR_i^* = CUR_i^0 \oplus \phi_{f_1}\left(\delta^{\left(int(CUR_{i-1}^0)+int\left(CUR_{d_1^1}^*\right)mod 2^n\right)}\right) \oplus$$
$$\phi_{g_1}\left(\beta^{\left(int(CUR_{i-1}^*)+int\left(CUR_{d_2^1}^*\right)mod 2^n\right)}\right),$$

where $$d_1^1=d_1^2(i)=i-2-(int(CUR_{i-1}^0) \bmod p_1^0(i),$$

$$d_2^1=d_2^1(i)=i-2-(int(CUR^*_{i-1}) \bmod p_2^0(i). \quad (11)$$

It is possible to compute $p_1^1(i)$ and $p_2^1(i)$ by $$p_1^1(i)=int(CUR^*_{i-2-d_3^2(i)}), p_2^1(i)=int(CUR^*_{i-2-d_3^3(i)}),$$

where $d_3^2(i)=int(CUR_{i-t_1^1}^0)$, $d_3^3(i)=int(CUR_{i-t_2^1}^0)$, and in this case we may compute $$t_1^1=int(CUR_{i-2}^0), t_2^1=int(CUR_{i-3}^0),$$

for $i=2^n+2, \ldots, k$, or $t_1^1$, $t_2^1$ are some constants such that $$2 \leq t_1^1 \leq 2^n-1, 2 \leq t_2^1 \leq 2^n-1.$$

In a more simplified situation, $d_3^{l(*)}(i)=s(l(*))$, where $s(l(*))$ is some constant different for different $l(*)$. The construction considered above can be expanded on the iterated masking procedure of any degree.

CUR Calculation II

In yet another embodiment of the present invention a CUR calculation may be achieved involving various elements of CUR of the iterated masking of non-zero degree. It is possible to fix n and assume that iterated masking of degree $l>0$ is performed.

Assume that the condition $$l+1<\phi(2^n-1),$$

takes place, that is, the number of the generators greater or equal to $l+2$, where $\phi(x)$ is the Euler's totient function.

It is then possible to consider generators $\delta_0, \delta_1, \ldots, \delta_l$ of the field $GF(2^n)$. It is not necessary to change the expression for $CUR_i$ calculation for $i=1, \ldots, 2^n+1$, however the formula will be different for $i>2^n+1$.

It is possible to set $$CUR_i = M_i \oplus (\delta_0^0)^{(int(M_{i-1})+int(CUR_{d_0^0}) mod 2^n)}$$
$$\oplus (\delta_1^0)^{(int(CUR_{i-2})+int(CUR_{d_1^0}) mod 2^n)} \oplus$$
$$\oplus (\delta_2^0)(int(CUR^*_{i-1})+int(CUR_{d_3^0}) mod 2^n)$$
$$\oplus (\delta_3^0)(int(CUR^{**}_{i-3})+int(CUR_{d_4^0}) mod 2^n) \oplus$$
$$\ldots$$
$$\oplus (\delta_{l+1}^0)^{(int(CUR_{i-l-1})+int(CUR_{d_{l+1}^0}) mod 2^n)}, \quad (12)$$

where $$d_0=i-2-int(M_{i-1}),$$

$$d_1=i-2-int(CUR_{i-1}),$$

$$d_2=i-2-int(CUR^*_{i-2}),$$

$$d_3=i-2-int(CUR^{**}_{i-3}),$$

$$\ldots$$

$$d_{l+1}=i-2-int(CUR_{i-l-1}^l),$$

$CUR_{i-l-1}^l$ may be the $(i-l-1)$-th element of the iterated masking sequence of degree l and the expressions for the elements from $CUR^*$, $CUR^{**}$, ..., $CUR^l$ may be presented.

Again, the formula for calculating, for instance, $CUR^*_i$ for $i=1, \ldots, 2^n+1$ may be the same as it was presented in prior art Canadian Patent No. 2,546,148.

Here is another way of forming CUR. For $i=2^n+2, \ldots, k$ it is possible to set $$CUR_i^* = CUR_i \oplus (\delta_0^1)^{(int(CUR_{i-1})+int(CUR_{d_0}^*)mod 2^n)} \oplus \quad (13)$$
$$(\delta_1^1)^{(int(CUR^*_{i-1})+int(CUR_{d_1}^*)mod 2^n)} \oplus (\delta_2^1)^{(int(CUR^{**}_{i-2})+int(CUR_{d_2}^*)mod 2^n)} \oplus$$
$$(\delta_3^1)^{(int(CUR^{**}_{i-3})+int(CUR_{d_3}^*)mod 2^n)} \oplus (\delta_l^1)^{(int(CUR_{i-1}^l)+int(CUR_{d_1}^*)mod 2^n)},$$

where $$d_0=i-2-int(CUR_{i-1}),$$

$$d_1=i-2-int(CUR^*_{i-1}),$$

$$d_2=i-2-int(CUR^{**}_{i-2}),$$

$$d_3=i-2-int(CUR^{***}_{i-3}),$$

$$\ldots$$

$$d_l=i-2-int(CUR_{i-1}^l),$$

Eventually for $i=2^n+2, \ldots, k$ it is possible to set $$CUR_i^l = CUR_i^{l-1} \oplus (\delta_0^l)^{\left(int(CUR_{i-1}^{l-1})+int\left(CUR_{d_0^l}^l\right)mod 2^n\right)} \oplus \quad (14)$$
$$(\delta_1^l)^{\left(int(CUR_{i-1}^l)+int\left(CUR_{d_1^l}^l\right)mod 2^n\right)}$$

where $$d_0^l=i-2-int(CUR_{i-1}^{l-1}),$$

$$d_1^l=i-2-int(CUR_{i-1}^l),$$

By $CUR_{i-1}^{l-1}$ and $CUR_{i-1}^l$ the $i-1$ elements of the sequences of degrees $l-1$ and $l$, correspondingly may be denoted.

Various constructions of CUR may be considered together with the modification presented above in "The modification of CUR calculation I" subsection. It is possible to consider the corresponding collections of $p_i$ in this case.

It is also possible to vary the generators and the fields generated by modulo different irreducible polynomials for CUR of different degrees.

It means that $\delta_i^0$ are generators of field constructed modulo irreducible polynomial f, which is different from irreducible polynomial, say g modulo of which field $GF(2^n)$ was built when generators $\delta_i^1$ were used and so forth.

If condition $l+1<\phi(2^n-1)$ is not valid, it is possible to have totally $\phi(2^n-1)IR(n)$ possibilities to combine the generators and different fields. For instance, if $n=4$ then 24 possibilities to use generators of different fields may exist, while, say for n=5 270 possibilities may exist.

Therefore in this case it is possible to use different combinations of generators (with different fields) having totally $\phi(2^n-1)IR(n)$ possibilities. If the degree of iterated masking is greater than 24 it is better to move to n>4.

Partitioning Procedure

In one embodiment of the present invention it is possible to apply a procedure of partitioning the elements of $CUR^{n_j}$ between the collections of tables $Tb^{n_j}{}_j=1,\ldots,c$. This can cause the distribution procedure to be faster and thereby accelerate the algorithm.

It is possible to fix n and, without loss of generality, describe the new partitioning procedure for CUR.

Consider an iterating masking process of degree $l \geqq 0$ and prepare two mappings $T_0$ and $T_1$ $$T_0: \{0,\ldots,2^n-1\} \to \Gamma_0$$

$$T_1: \{0,\ldots,2^n-1\} \to \Gamma_1$$

where $\Gamma_0$ and $\Gamma_1$ are sets of random positive non-zero x<r. Recall that r is the number of tables between which the elements of $CUR^l$ may be distributed. In general, for x, $y \in \{0,\ldots,2^n-1\}$ and $x \neq y$ $$T_0(x) = T_0(y)$$

and $$T_1(x) = T_1(y).$$

However, it may happen that $$T_0(x) \neq T_1(x)$$

for all $x \in \{0,\ldots,2^n-1\}$ and even $\Gamma_0 \cap \Gamma_1 = \emptyset$.

It is possible to begin hashing a message M (with jumping or without jumping) and consider $CUR_1{}^l$, where $l \geqq 0$ is the iterating masking of degree l. If M[1] is 0, it is possible to assign $CUR_1{}^l$ to the table with index $T_0(int(CUR_1{}^l))$, otherwise it is possible to assign it to the table with index $T_1(int(CUR_1{}^l))$. Reference to the table to which CURL is assigned may be to the current table and its index may be denoted thereby $T_{c_1}$.

Denote by B[2] the first bit of element $M_2$, for which it is possible to compute $CUR_2{}^l$. Again, if B[2] is 0 it is possible to assign $CUR_2{}^l$ to table $$T_{c_1} + T_0(int(CUR_2{}^l)) \bmod r;$$

otherwise, $CUR_2{}^l$ will be sent to table with index $$T_{c_1} + T_1(int(CUR_2{}^l)) \bmod r.$$

On the i-th step of calculation, it is possible to assign $CUR_i{}^l$ to the table with index $$T_{c_1} + T_{c_2} + \ldots + T_{c_{i-1}} + T_0(int(CUR_i{}^l)) \bmod r$$

if B[i] is 0, and to the table with index $$T_{c_1} + T_{c_2} + \ldots + T_{c_{i-1}} + T_1(int(CUR_i{}^l)) \bmod r$$

otherwise.

Define another, more complicated way of calculating the indices of the tables to which it is possible to assign the corresponding elements of $CUR^l$. Assume, for example, that l=3. On the first step of the calculation, if B[1] is 0, it is possible to assign $CUR^{***}{}_1$ to the table with index $$T_0(int(CUR_1 \oplus CUR^*{}_1 \oplus CUR^{}{}_1 \oplus CUR^{*}{}_1)).$$

Otherwise, it may be assigned to the table with index $$T_1(int(CUR_1 \oplus CUR^*{}_1 \oplus CUR^{}{}_1 \oplus CUR^{*}{}_1)).$$

On the i-th step of calculation B[i] may be estimated. If B[i] is 0, it is possible to send $CUR_i{}^{***}$ to the table with index $$T_{c_1} + T_{c_2} + \ldots + T_{c_{i-1}}(int \\ (CUR_i \oplus CUR^*{}_i \oplus CUR^{}{}_i \oplus CUR^{*}{}_i)) \bmod r.$$

If not, it is possible to assign it to the table with index $$T_{c_1} + T_{c_2} + \ldots + T_{c_{i-1}} + T_1(int \\ (CUR_i \oplus CUR^*{}_i \oplus CUR^{}{}_i \oplus CUR^{*}{}_i)) \bmod r.$$

In general, for l>0 it may be possible to consider any l+1-placed function Cl $$Cl: F_2{}^n \times \ldots \times F_2{}^n \to F_2{}^n$$

and then, depending on B[i], calculate the index $$T_{c_1} + T_{c_2} + \ldots + T_{c_{i-1}} + T_0(int(Cl(CUR_i, CUR^*{}_i, \ldots, CUR_i{}^l))) \bmod r,$$

or $$T_{c_1} + T_{c_2} + \ldots + T_{c_{i-1}} + T_1(int(Cl(CUR_i, CUR^*{}_i, \ldots, CUR_i{}^l))) \bmod r$$

of the table, to which $CUR_i{}^l$ will be sent, $i=1,\ldots,k$.

In general, any function modulo r may be used to calculate the indices of the activated tables.

Requirements for the Lengths of the Bit Strings

In one embodiment of the present invention the bit strings may play an important role in the polynomial-based hash algorithm. The bit string requirements disclosed herein may increase security of the function, as they increase the number of inner states of the algorithm.

In one embodiment of the present invention it is possible to assign different sizes to different bit strings even when the considered bit strings are associated with the same table.

Thus, for tables $Tb_i{}^{n_j}$ bit strings $e_{ix}{}^{n_j}$ may be assigned that have different lengths $sz_{ix}{}^{n_j}$ for a collection of indices $x \in \Theta_i{}^{n_j}$ associated to the table $Tb_i{}^{n_j}$ for $i=1,\ldots,r^{n_j}, j=1,\ldots,c$, where $r_{n_j}$ is a number of tables prepared for the corresponding j. So, for all $i=1,\ldots,r^{n_j}$, and $j=1,\ldots,c$, it is possible now to have $$sz_{ix}{}^{n_j} \neq sz_{iy}{}^{n_j} \tag{15}$$

for any x and y such that $x \neq y$, and x, $y \in \Theta_i{}^{n_j}$.

Splitting with Jumping and the Bit Strings

In one embodiment of the present invention bit strings may be related to splitting with jumping. Embedding new bit strings into the construction of the hash function may lead to increasing the numbers of inner states of the function, which, in turn may increase the security of the function and allow more effective control of the inner structure of the function.

A first step may be to fix n and assume that splitting with jumping is to be performed. It means that by some algorithm integers $q_i$ may be generated, such that $0 \leqq q_i \leqq n$, $i=1,\ldots,k$, to form a sequence (4). A new collection of bit strings may be defined, which will be referenced as bit strings related to jumping. We will refer the collection of the bit strings as BSJ.

To each table $Tb_j$, it is possible to generate another collection of bit strings $\epsilon_{js}$ of size $\delta_{js}$, $j=1,\ldots,r$, $s \in \Xi_j$, where $\Xi_j$ is a collection of indices associated with a table $Tb_j$, for which the bit strings $\epsilon_{js}$ are formed. A bit string $\epsilon_{j0}$ may be reserved that is not related to any particular element of table $Tb_i$. If $\Xi_i$ contains the indices for all $s=1, 2^{n_j}$, a special bit string $\epsilon_{i0}$ is not required, and therefore, in that case $0 \notin \Xi_i$. Otherwise any of the $\Xi_i$ contains 0, that is, a special bit string is always prepared. Therefore $x \in \Xi_i$ and $x \neq 0$ means that for $i=1,\ldots,r$, a bit string $\epsilon_{ix}$ is prepared and the bit string is associated to entry x−1 of table $Tb_i$. Denote by $\epsilon_{js}(t)$ the t-th bit of a bit string $\epsilon_{js}$, for $t=1,\ldots,\sigma_{js}$, $j=1,\ldots,r$, $s \in \Xi_j$. Before processing, all of the bits within each of the bit strings are set to 0.

Updating the Bit Strings Related to Jumping: Scheme I

In one embodiment of the present invention it is possible to assume that the iterated masking procedure of degree $l(*) \geq 0$ is constructed and let $CUR_1^{l(*)}$ be the first element. Assume also that a table $Tb_{x_1}$ is activated and denote $y_1 = int(CUR_1^{l(*)})$. Then if $y_1 + 1 \in \Xi_{x_1}$, it is possible to set $$\epsilon_{x_1 y_1 + 1}(q_1) = 1,$$

otherwise $$\epsilon_{x_1 0}(q_1) = 1,$$

Consider $CUR_2^{l(*)}$ and let $Tb_{x_2}$ be a table that was activated by $y_2 = CUR_2^{l(*)}$.

Then if $y_2 + 1 \in \Xi_{x_2}$, it is possible to set $$\epsilon_{x_2 y_2 + 1}(q_1 + q_2) = 1,$$

otherwise $$\epsilon_{x_2 0}(q_1 q_2) = 1,$$

Here, $q_1$ and $q_2$ are the corresponding integers that were generated during splitting with jumping and, of course, it may be presumed that $q_1 + q_2 < \sigma_{x_2 y_2 + 1}$ and $q_1 + q_2 < \sigma_{x_2 0}$.

Assume further that $CU_m^{l(*)}$ is calculated and let $Tb_{x_m}$ be a table that was activated by $y_m$, where $y_m = CUR_m^{l(*)}$. Then if $y_m + 1 \in \Xi_{m_2}$ it is possible to set $$\epsilon_{x_m y_m + 1}(q_1 q_2 + \ldots + q_m \bmod \sigma_{x_m y_m + 1}) = B \oplus 1,$$

otherwise $$\epsilon_{x_m 0}(q_1 + q_2 + \ldots + q_m \bmod \sigma_{x_m 0}) = B \oplus 1,$$

where B was the $(q_1 + q_2 + \ldots + q_m \bmod \sigma_{x_m 0})$-th bit value of the considered bit string before the update occurred.

Updating the Bit Strings Related to Jumping: Scheme II

In another embodiment of the present invention it is possible to consider one more scheme of updating the bit strings relating to jumping. According to Scheme I, presented above, the bit strings may be updated based on the values of $q_1, \ldots, q_k$, where k is a total number of elements of splitting a message M. Forming the procedure of updating the bit strings, may be based on the usage of $M_i$, $i = 1, \ldots, k$ and various elements of CUR.

Prepare mapping $$\alpha: \{0, \ldots, 2^n - 1\} \to \Delta,$$

where $\Delta$ is a set of random integers greater than 0. In general, $|\Delta| \geq 2^n$.

Let again $CUR_1^{l(*)}$ be the first element of the iterated masking procedure. Assume that a table $Tb_{x_1}$ is activated and denote $y_1 = int(CUR_1^{l(*)})$. Then if $y_1 + 1 \in \Xi_{x_1}$, it is possible to set $$\epsilon_{x_1 y_1 + 1}(\alpha(int(M_1) + int(CUR_1^{l(*)})) \bmod \sigma_{x_1 y_1 + 1}) = B \oplus 1,$$

where B is the value of the $\epsilon_{x_1 y_1 + 1}$ $(\alpha(int(M_1) + int(CUR_1^{l(*)})) \bmod \sigma_{x_1 y_1 + 1})$-th bit of bit string $\epsilon_{x_1 y_1 + 1}$ before the updating. If $y_1 + 1 \notin \Xi_{x_1}$, it is possible to set $$\epsilon_{x_1 0}(\alpha(int(M_1) + int(CUR_1^{l(*)})) \bmod \sigma_{x_1 0}) = B \oplus 1,$$

where, again B is the corresponding bit value of bit string $\epsilon_{x_1 0}$ before the updating.

Assume, further that a table $Tb_{x_i}$ is activated by element $CUR_i^{l(*)}$ on the i-th step of processing. Denote $y_i = int(CUR_i^{l(*)})$ and assume that $y_i + 1 \in \Xi_{x_i}$. Then it is possible to set $$\epsilon_{x_i y_i + 1}(\alpha(int(M_i) + int(CUR_1^{l(*)})) \bmod \sigma_{x_i y_i + 1}) = B \oplus 1,$$

otherwise, $$\epsilon_{x_i 0}(\alpha(int(M_i) + int(CUR_1^{l(*)})) \bmod \sigma_{x_i 0}) = B \oplus 1,$$

We note that B is an appropriate bit value of the corresponding bit string before updating.

Any function $\alpha$ involving the elements M, $CUR_i^{l(*)}$, $i = 1, \ldots, k$, $l(*)$, $= 0, \ldots p$ may be utilized here.

After forming the tables and the bit strings related to jumping, a computation of values BSJ may be undertaken in accordance with $$BSJ(i) = \sum_{x \in \Xi_i} (x + 1) int(\epsilon_{ix})$$

$$i = 1, \ldots, r.$$

The Bit Strings Related to Iterated Masking

Another class of bit strings may naturally arise during an iterated masking procedure of degree $l \geq 0$, and this class may be formed in a few ways. Generally, the realization of the iterated masking procedure of degree greater than 0 is a powerful way of increasing the security of the function. Furthermore, embedding the new class of bit strings into the construction of the function will increase its security even more. It is possible to refer the bit strings of the new class as BST bit strings of the corresponding degree.

Let M be a message. Let n be fixed and consider the iterating masking procedure of degree $l \geq 0$. It is possible to calculate the elements of CUR sequences of degrees starting from 0 up to $l > 0$. Denote the corresponding sequences $CUR^{l(*)}$, where $l(*) = 0, 1, \ldots, l$. In general, instead of $CUR^{0(*)}, CUR^{1(*)}, CUR^{2(*)}, \ldots$ simply may write CUR, CUR*, CUR**, $\ldots$, correspondingly.

It is clear that it is not necessary a priori to calculate all the elements of $CUR^{0(*)}$, $CUR^{1(*)}$ and so forth. During the stages of the calculation it is possible to prepare only those elements of the corresponding sequences $CUR^{l(*)}$ that are needed for the calculation of the elements of sequence $CUR^{l(*)+1}$.

For example, for $l = 2$ and for some $i > 2^n + 2$, to calculate $CUR^{**}_i$, it is possible to have calculated just $$CUR^*_i, CUR^*_{i-1}$$

and $2^n$ elements $$CUR^{}_j, CUR^{}_{j+1}, \ldots, CUR^{**}_{j+2^n-1},$$

where $j = i - 2 - 2^n$.

Now to each table, it is possible to additionally associate, in general, $l + 1$ layers or collections of new bit strings. These new bit strings may be referenced as the bit strings related to iterated masking of the corresponding degree, or simply the bit strings of the corresponding degree. These new bit strings will be related to the collections $CUR^{l(*)}$ for $l(*) = 0, 1, \ldots, l$, where $l(*)$ is the degree of the considered masking procedure.

First, let us define a layer of the bit strings of degree 0. Assume that a map may be defined $$\rho_0: \{0, 1, \ldots, 2^n - 1\} \to Y_0$$

where $Y_0$ is a collection of random non-zero positive integers. For instance, $Y_0$ may consist of random elements from 1 to $2^n$. In general, it may happen that $$\rho_0(x) = \rho_0(y)$$

for $x, y \in \{0, 1, \ldots, 2^n - 1\}$ and $x \neq y$.

Denote, further, by $v_i^0$ a collection of bit strings associated to table $Tb_i$, i=1, ..., r. Any such collection may contain no more than $2^n$ bit strings. Then let $W_i^0$ be a subset of $\{1, ..., 2^n\}$. $W_i^0$ reflects the entries of table $Tb_i$, for which the corresponding bit string will be defined, i=1, ... r. Expression $x \in W_i^0$ means that for the x–1 entry of the table, a bit string $v_{ix}^0$ of length $sz_{ix}^0$ is arranged. If $$W_i^0 \neq \{1, ..., 2^n\}$$

one more special bit string $v_{i0}$ that will not be associated to any entry of the table $Tb_i$, is reserved, i=1, ..., r. A special bit string for the table $Tb_i$ may not be reserved if $$W_i^0 \{1, ..., 2^n\}$$

i=1, ..., r.

As usual, all of the bits for each of the bit strings are set to 0 before processing.

Denote by $v_{js}^0(t)$ the t-th bit of the bit string $v_{js}^0$, j=1, ..., r and $s \in W_j^0$. Assume that $CUR_1^0$ has been calculated and assume also that a table $Tb_{x_1}$ is activated.

Set $$y_1 = \rho_0(int(CUR_1^0)).$$

Then for $z_1 = int(CUR_1^0)+1$, if $z_2 \in W_{x_1}^0$, it is possible to set $$v_{x_1 z_1}^0(y_1) = B \oplus 1,$$

otherwise $$v_{x_1 0}^0(y_1) = B \oplus 1.$$

Here, B is the value of the $y_1$-th bit of the bit string $v_{x_1 z_1}$ before updating. In our case, B is 0, as all of the bits in each of the bit strings are set to 0 from the beginning.

Assume that a sequence $$CUR_1^0, ..., CUR_{j-1}^0, CUR_j^0$$

is calculated for some j>1 and denote $$y_1 = \rho_0(int(CUR_1^0)), ..., y_j = \rho_0(int(CUR_j^0)).$$

Assume also that all of the bit strings for the corresponding tables were processed when the elements $$CUR_1^0, ..., CUR_{j-1}^0$$

were distributed. It is now possible to process $CUR_j^0$.

Assume that a table $Tb_{x_j}$ was activated by $CUR_j^0$ and let $z_j \in W_{x_j}^0$, where $z_j = int(CUR_j^0)+1$. Then it is possible, for example, to set $$v_{x_j z_j}(y_1 + ... + y_j \mod sz_{x_j z_j}^0) = B \oplus 1.$$

If $z_j \notin W_{x_j}^0$, it is possible to set $$v_{x_j 0}(y_1 + ... + y_j \mod sz_{x_j 0}^0) = B \oplus 1.$$

Similarly, having defined mappings $$\rho_1 : \{0, 1, ..., 2^n - 1\} \to Y_1.$$

...

$$\rho_l : \{0, 1, ..., 2^n - 1\} \to Y_l.$$

it is possible to process the layers of bit strings $v_i^1, ..., v_i^l$, i=1, ..., related to the iterated masking collections $CUR^1, ..., CUR^l$ of the corresponding degrees. Of course, the collections $$Y_0, Y_1, ..., Y_l$$

of random non-zero positive integers may all be different. In addition, the mappings $$\rho_0, \rho_1, ..., \rho_l$$

may be all different as well.

Any other operation, different from $(y_1 + ... + y_j) \mod sz_{x_j z_j}^0$ as presented above, may be used in forming bit strings. For example, it may be possible to apply the expression $$(y_1 + y_2 + ... + y_j)^2 \mod sz_{x_j z_j}^0$$

and so forth.

Having finished the procedure of forming the tables and the bit strings for all layers, it is now possible to move to the next stage of hash-value calculation. This involves computing the special values BST. There may be at least two ways of computing BST.

Firstly, for each table $Tb_i$, i=1, ..., r, it is possible to compute BST in accordance with $$BST(i) = \sum_{x \in W_i^0} (x+1) int(v_{ix}^0) + 2 \sum_{x \in W_i^1} (x+1) int(v_{ix}^1) + ... + (l+1) \sum_{x \in W_i^l} (x+1) int(v_{ix}^l).$$

Secondly, assume that the sizes of the bit strings $v_{js}^{l(*)}$, j=1, ..., r and $s \in W_j^0$ are equal for a particular table and layer, that is, $$sz_{js_1}^0 = sz_{xjs_2}^0,$$

for all $s_1, s_2$ such that $s_1 \neq s_2$, $s_1, s_2 \in W_j^0$, and $$sz_{js_1}^1 = sz_{js_2}^1$$

for all $s_1, s_2$ such that $s_1 \neq s_2$, $s_1, s_2 \in W_j^1$, and so forth.

It is possible that $sz_{js}^{l'(*)}$ may not be equal to $sz_{js}^{l(*)}$ even if both $W_j^{l'(*)}$ and $W_j^{l(*)}$ contain the same element s for any j=1, ..., r and l(*)=0, ..., l, l'(*)=0, ..., l, where $l(*) \neq l'(*)$.

In this case, BST(i) is computed as follows $$BST(i) = int(\oplus_{\{x \in W_i^0\}} v_{ix}^0) + 2 int(\oplus_{\{x \in W_i^1\}} v_{ix}^1) + ... + (l+1) int(\oplus_{\{x \in W_i^l\}} v_{ix}^l)$$

for i=1, ..., r.

The symbol $\oplus_{\{x \in W_i^0\}} v_{ix}^0$ may be used in the following context. For any $Y = \{x_1, ..., x_k\}$, $$\oplus_{\{x \in Y\}} z_x = z_{x_1} \oplus ... \oplus z_{x_k}.$$

Formula for Calculating Sums (Knapsacks)

In one embodiment of the present invention, having constructed new types of the bit strings, namely those related to jumping and iterated masking of all degrees, the formula for calculating the corresponding sum (knapsack) may be different. Thus, the formula of calculating a sum V for a fixed n, may be as follows $$V = BSJ(1) + BST(1)) + 2(BSJ(2) + BST(2)) + ... + r(BSJ(r) + BST(r)).$$

The Recursive Consecutive Padding I

In embodiments of the present invention multiple methods for constructing new padding sequence for a message M may be applied. Such padding schemes may increase the security of the hashing algorithm because for any file it is possible to use a practically unique padding sequence.

Let M be a sequence of bits of size k and assume that M is not padded beforehand.

After splitting, masking, partitioning, and forming the bit strings, it is possible to obtain tables $Tb_i^{n_j}$, i=1, ..., $r_{n_j}$; j=1, ..., c, where $r_{n_j}$ are the numbers of the tables generated for the corresponding In addition, for every table $Tb_j^{n_i}$ it is possible to generate the bit strings $e_{js}^{n_i}$, j=1, ... $r_{n_i}$, i=1, ..., c, $s \in \Theta_j^{n_i}$, where $\Theta_j^{n_i}$ is a collection of indices associated with a table $Tb_j^{n_i}$ for which the corresponding bit strings are formed.

The collections of indices $\Theta_j^{n_i}$ may either be determined prior to the start of hashing or defined during the process of CUR distribution. In general, the sizes of the bit strings for different tables can be different. Assume that the procedure of forming tables and bit strings for a message M is completed for all $n_j$. Denote by $CUR_{l_j1}^{n_j}$ the final values in the c collections $$CUR^{n_1}, CUR^{n_2}, \ldots, CUR^{n_c}, \quad (16)$$

respectively.

As it is possible to perform splitting with jumping for some or even for all $n_j$, the indices $l_j$ may be different for different $n_j$, $j=1, \ldots, c$.

Denote, further, by $\zeta_1^{n_j}$ the indices of the tables that were activated by $CUR_{l_j1}^{n_j}$ for the corresponding $j=1, \ldots, c$. Define $$\alpha_1^{n_j} = \mu x [int(CUR_{l_j1}^{n_j}) < x] \quad (17)$$

if there exists $x \in \Theta_{\zeta_2^{n_j}}$ such that $x > CUR_{l_j1}^{n_j}$ or $$\alpha_1^{n_j} = 0 \quad (18)$$

otherwise. Here, $\mu x$ means "the smallest x such that".

It is then possible to pad M by consecutively processing the bits from the bit strings $$e_{\zeta_1^{n_j} \alpha_1}^{n_j n_j} \quad (19)$$

for $j=1, \ldots, c$.

Performing the padding steps, it is possible to summarize the number of bits within the bit strings (19) that were used during the padding steps for $j=1, \ldots, c$. If the sum of the lengths of the bit strings is equal to 4096, it is possible to stop the padding and conclude the process of forming the tables and the bit strings by "wrapping up" the message M [1].

Assume, however, that all of the bit strings (19), for $j=1, \ldots, c$ are used, and assume, further, that the total sum of the lengths of the bit string is less than 4096.

In this case, denote by $CUR_{l_j2}$ the final values in the c collections $$CUR_{p_1}^{n_1}, CUR_{p_1}^{n_2}, \ldots, CUR_{p_1}^{n_c} \quad (20)$$

that were obtained after padding the message by bit strings (19). The index $p_1$ indicates that the first iteration of padding has already been performed while forming the collection of polynomials $CUR_{p_1}^{n_j}$, $j=1, \ldots, c$.

Denote by $\zeta_2^{n_j}$ the indices of the tables that were activated by $CUR_{l_j2}^{n_j}$ for the corresponding $j=1, \ldots, c$. Define $\alpha_2^{n_1}$ in accordance with (17) and (19). It is possible now to use $\zeta_2^{n_j}$ and $CUR_{l_j2}^{n_j}$ in (17) and (19) instead of $\zeta_1^{n_j}$ and $CUR_{l_j}^{n_j}$, respectively. That is, $$\alpha_2^{n_j} = \mu x [int(CUR_{l_j2}^{n_j}) < x] \quad (21)$$

if there exists $x \in \Theta_{\zeta_2^{n_1}}$ such that $x > CUR_{l_j1}^{n_j}$ or $$\alpha_2^{n_j} = 0 \quad (22)$$

otherwise. The second padding iteration may be started by consecutively using bits within the bit strings $$e_{\zeta_2^{n_j} \alpha_2}^{n_j n_j} \quad (20)$$

for $j=1, \ldots, c$ and continuously calculate the total number of bits which were used to pad M. Again, when the total sum of the bits reaches 4096 it is possible to stop padding, otherwise the third, then the fourth iteration may be executed, and so on. The padding procedure terminates when the total number of bits used for padding is equal to 4096. A person skilled in the art would appreciate that any number of bits, not just 4096 may be chosen.

Non-Recursive Consecutive Padding

In another embodiment of the present invention, it is possible to apply a non-recursive consecutive padding scheme. This is a scheme, that involves the formation of a sequence of bits, by means of which it is possible to pad a message simply "copying" the bit strings one after another in accordance with the procedure described above.

In other words, the first bit string that will be used as the first "portion" of the padding sequence may be chosen and processed. After the processing of the bit string is completed, it is possible to take another bit string, process it and so forth. The procedure of choosing the bit strings that will form the padding sequence has been considered above in the context of recursive consecutive padding I.

The Partial Backward Splitting

In embodiments of the present invention it is possible to apply a partial backwards splitting procedure. In practice a file is read from disc to memory portion by portion. Usually such portions have a fixed size. For the purpose of the present invention it is possible to assume that the length of the portion may be fixed and it is possible to denote it by lp. So, let M be a hashed message.

It is possible to present M as a collection of the portions $sp_i$, $i=1, \ldots, u$, where $sp_1$ is the first part (a portion) of a file M, $sp_2$ is the second portion of M, and so forth. Denote by $len(sp_i)$ the length of portions $sp_i$, $i=1, \ldots, u$. Note that $len(sp_i) = lp$ for $i=1, \ldots, u-1$ and $len(sp_u) \leq lp$, so that $$|M| = (u-1)lp + len(sp_u).$$

The splitting procedure may be applied to a file presented as a collection of portions in the following way. Firstly, the direct splitting procedure (without or with jumping) will be applied to a padded file. For the direct splitting procedure it does not matter, in fact, that a file is presented in a form of a collection of portions. However the backward splitting procedure is modified now.

Denote by $Op(sp_i)$ a collection of bits that may be obtained by inverting the portion $sp_i$, $i=1, \ldots, u$. For example, if a is a collection of bits

011010001110101, where 0 is the first bit, 1 is the second bit and so forth, then Op(a) is the following collection of bits

101011100010110.

Thus, the first bit of Op(a) is 1, the second bit is 0 and so forth.

Let M be a hashed message (a file) and assume that M may be presented as a collection of portions $sp_i$ of length lp, $i=1, \ldots, it$, so that $$M = sp_1 \| sp_2 \| \ldots \| sp_u,$$

where by $\|$ it is possible to denote the concatenation of the corresponding portions. Next it is possible to form $M^{op}$, where $$M^{op} = Op(sp_1) \| Op(sp_2) \| \ldots \| Op(sp_u).$$

Then it is possible to apply, for example, the direct splitting procedure (without or with jumping) to the obtained message (file). After the processing M and $M^{op}$ is completed it is possible to apply a padding procedure.

This direct splitting procedure applied to padded $M^{op}$ may be referenced as the partial backward splitting.

The partial backward splitting is a convenient splitting procedure, for instance, for on-line processing, because it does not have to be applied to the whole file. At the same time considering the partial backward splitting increases the security of the function.

In general, the partial backward splitting for a few different n may be applied. It is also possible to consider a few partial backward splitting, some of which are with jumping and the rest are without jumping. In this case it is possible to consider a few partial backward splitting for the same n, one of which is without jumping and the rest are with different jumping conditions.

These different conditions can be defined, for instance, by considering different jumping tables. It may also be possible to consider a few partial backward splitting with the same n and with different jumping tables.

Secure Hashing Construction

In one embodiment of the present invention a MAC (a secure hashing) construction for the polynomial-based hashing function is introduced. The construction is based on new classes of the bit strings.

Let S be a key of size l and denote by $S_i$ the i-th bit of sequence S, i=1, ..., l. Choose, further, some numbers $u_j < 2^{n_j}$, where j=1, ..., c. The numbers $u_j$ will define the number of the bit strings associated to each j=1, ..., c. These numbers are determined beforehand.

Assume that $1 < r_j$, where $r_j$ is a number of tables prepared for $n_j$.

If the goal is to connect the number of bit strings associated to the tables related to $n_1$ to the bits of the sequence $S_i$, to realize this connection, it is possible to determine the number of the bit strings $\Phi_i^{n_1}$ associated to a table $Tb_i^{n_1}$ in accordance with the following rule: For $\forall i \leq l$ it is possible to set $$\Phi_i^{n_1} = \begin{cases} u_1, & \text{if } S_i = 1; \\ u_1 - 1, & \text{if } S_i = 0. \end{cases} \quad (24)$$

For the remaining i=l+1, ..., $r_1$ it is possible to set $\Phi_i^{n_1} = u_1$.

Assume now that $$l < \sum_{j=1}^{c} r_j$$

and suppose that for t and $m^{n_t}$ such that $1 \leq t \leq c$ and $1 \leq m^{n_t} \leq r^{n_t}$, there takes place $$l < \sum_{j=1}^{n_t-1} r_j + m^{n_t}.$$

It is possible to process the following settings step by step.

For i=1, ..., $r_1$, it is possible to set $$\Phi_i^{n_1} = \begin{cases} u_1, & \text{if } S_i = 1; \\ u_1 - 1, & \text{if } S_i = 0. \end{cases} \quad (25)$$

Then for i=1, ..., $r_2$, and $f_1 = r_1$, it is possible to set $$\Phi_i^{n_2} = \begin{cases} u_2, & \text{if } S_{f_1+i} = 1; \\ u_2 - 1, & \text{if } S_{f_1+i} = 0. \end{cases} \quad (26)$$

...

$$\Phi_i^{n_t-1} = \begin{cases} u_{n_t-1}, & \text{if } S_{f_{n_t-2}+i} = 1; \\ u_{n_t-1} - 1, & \text{if } S_{f_{n_t-2}+i} = 0. \end{cases} \quad (27)$$

Here i=1, ..., $r_{n_t-1}$, and $f_{n_t-2} = f_{n_t-3} + r_{n_t-2}$.

It is possible to complete the process by setting $$\Phi_i^{n_t} = \begin{cases} u_{n_t}, & \text{if } S_{f_{n_t-1}+i} = 1; \\ u_{n_t} - 1, & \text{if } S_{f_{n_t-1}+i} = 0. \end{cases} \quad (28)$$

for i=1, ..., $m^{n_t}$ and $f_{n_t-1} = f_{n_t-2} + r_{n_t-1}$

The number of bit strings for the remaining tables are unchanged. Recall that from the very beginning $u_j$ was defined to be the number of the bit strings for all the tables for the corresponding j=1, ..., c.

The Parameterization of the Hash Function

In one embodiment of the present invention, it is possible to parameterize the considering hash function. The aim of the parameterization is to generate a wide class of the hash functions with different properties. There are a few possibilities to parameterize the function.

The Parameterization of the Size of a Hash Value

According to the NIST requirements a hash value can be 160, 224, 256, 384, or 512 bits of size.

The size of final hash value τ can be changed by changing $GF^*(2^\tau)$.

It may be necessary to change one more parameter, namely, the sizes of the bit strings, to generate a hash value of the corresponding size in order to make sure that hash values are correctly generated even for the messages of a small size. There are two possibilities to realize the correspondence between the size of a hash value and the sizes of the bit strings.

Every time when the size of a hash value is changed it is also possible to change the minimal size of the bit strings. For example, if for instance the size of a hash value is 256 bits, the minimal sizes of the bit strings should be greater or equal to 256 bits.

In yet another embodiment of the present invention, an additional means of realizing the correspondence between the size of a hash value and the sizes of the bit strings may be applied. Assume that it is possible a priori to know that the possible biggest size of a hash value, generated by the algorithm within some frame of time, is τ. For instance, let τ=384 bits, which means that it is possible to generate the hash values of 160, 224, 256 and 384 bits. In this case it is possible to set the minimal sizes of the bit strings as equal to 384 and it is not necessary to change the sizes of the bit strings within a considered time frame.

Parameterization of the Speed of the Function

In another embodiment of the present invention, parameterization of the speed of the function may be achieved by choosing splitting with jumping and defining mappings ϕ with the larger jumping bit distance (see the section "Splitting with jumping").

Parameterization of the Security of the Function

The prior art points to several ways of increasing the security of the function. For example, the security of the algorithm may be increased by increasing: the number of tables; the number and the sizes of the bit strings prepared for the tables; and the degree of the iterated masking. Additionally, the security of the function can be increased by increasing the value c, that is by increasing the number of $n_j$, j=1, ... c, for which all steps of the algorithm may be executed.

A relatively "cheap" method of increasing the security is achieved by the following method. Assume that it is possible to realize the iterated masking of degree l>0. The security of the function can be increased by means of increasing the number of layers of the bit strings that are reserved for the tables. If, for instance l=3, it may be possible to reserve up to 4 layers of the bit strings related to $CUR^{l(*)}$, $l(*)=0, \ldots, 3$. It may not be necessary to reserve all four layers. However, by increasing the number of the layers the security may be increased significantly. At the same time increasing the number of the layers leads to increasing the consumed memory, however it only minimally affects the speed of the function.

There is one more important moment related to the layers of the bit strings. Assume that only two layers of the bit strings are reserved for the iterated masking procedure of degree, say 4. There arises the question of choosing the two values of $l(*)$, for which layers are reserved. Keeping in mind that the relation between the elements of splitting and the corresponding elements of the iterated masking of higher degree is more difficult to analyze, it is possible to conclude that security of the function may be increased if two layers are reserved for $l(*)=4$, and $l(*)=3$.

The Customization of the Hash Function

In one embodiment of the present invention, a paradigm for generating the hash functions by changing their inner structures is introduced. This procedure is referenced as customizing the hash function. There is a fundamental difference between the procedures of parameterization and customization of the hash function. Parameterization is the procedure of varying the security, the speed, or the memory consumption, etc. of the hashing algorithm, while customization is the procedure of generating (duplicating) the hash function with a different inner structure while keeping approximately the same level of security, speed, memory consumption, etc. In embodiments of the present invention varying methods of performing customization may be achieved.

Varying the Number of the Bit Strings

Consider an iterated masking procedure of degree $l \geq 0$ with splitting with jumping for direct and forward splitting. Denote by $r_1$ and $r_2$ the numbers of the tables prepared for direct and forward splitting, respectively. Up to l+3 layers of the bit strings associated to each table may exist (for either the direct or forward scheme of distribution) under the considered conditions. Indeed, l+1 layers are related to l+1 collections $CUR^{l(*)}$, $l(*)=0, \ldots, l$. One layer is related to the bit strings associated to the distribution procedure and another layer is associated with splitting with jumping.

Let $lm_1$ be a parameter (a bit sequence) of length $r_1+r_2$. Then, based on the scheme, according to which one changes the number of the bit strings associated to all $r_1+r_2$ tables (described above in the MAC Construction section), the structure of the hash function may be customized.

In general it may be possible to consider up to $2^{2^n}$ possibilities to choose the bit strings related to different indices of the tables.

Varying the Number of Layers of the Bit Strings

Consider now an iterated masking procedure of degree l>0. Denote by $lm_2$ the parameter (a bit sequence) of length l and let $lm_2(i)$ be the i-th bit of $lm_2$, i=0, 1, ..., l.

The customization procedure in this case may be realized in the following way. If $lm_2(0)$ is 0, the layer of the bit strings may not be created for $CUR^0$. Otherwise, the corresponding layer may be reserved for all the tables. If $lm_2(1)$ is 0 it is not necessary to reserve the layer of the bit strings for $CUR^*$. Otherwise the layer may be created. This process continues for all degrees.

Assume now that the direct and backward splitting may be performed with iterated masking of degrees $l_1$ and $l_2$, respectively. The size of $lm_2$ will be at least $l-1+l_2+l_2+2$, as the procedure just described can be expanded on the backward process of the calculation as well.

Varying the Number of the Bit Strings and the Number of Layers of the Bit Strings In one embodiment of the present invention, the inner structure of the function may be altered by changing both the bit strings and the number of the layers of the bit strings. In this case the size of the customizing parameter can be $lm_1 + lm_2$.

The Schemes of Customizing the Hash Function

In one embodiment of the present invention schemes of the customization of the hash function may be applied. For example:

The Customizing Scheme A

A message M may be hashed with a certain customizing parameter Im, so we may save the parameter Im in a public registry and send a message M with appended hash value h to a receiver. A receiver hashes the obtained message M using the parameter Im from a public registry, compares the new hash value with the appended one.

It is possible to change a customizing parameter in a public registry either every time when a message is hashed, or with certain interval of time. A customizing parameter can be generated by a pseudo-random generator as a random sequence of bits o f the corresponding length.

The Customizing Scheme B

The customizing scheme B may be effective in a hardware realization of the hash function. In accordance with the scheme a number of customizing parameters are generated. These are then numerated and saved in a special directory of any PC. For instance, this scheme may be realized in LAN. For example, a collection of customizing parameters may be generated and saved in a public directory. Hashing a message M may involve choosing the corresponding customizing parameter by pointing out the number of the used customizing parameter and sending the number to a public registry. A receiver may hash the obtained message, choosing the customizing parameter from a public directory based on the chosen index.

Keeping in mind the hardware realization of the algorithm, it is possible to place the collection of the customizing parameters in a flash memory. Assuming that all the computers use hardware realization of the hash function, that is the corresponding boards, such as, for example, FPGA or ASIC, may be included in all the computers in LAN. In such an environment it is possible to prepare the same collection of the customizing parameters in certain order for all the computers in LAN. In order to hash a message it is necessary to know solely the index of the customizing parameter, in accordance with which we customize the structure of the function. Switching from one index to another may be carried out from time to time in accordance with the security policy of LAN. Of course, all the customizing parameters may be protected by standard methods of protection of information in a flash memory or FPGA or ASIC. The preliminary placed collection of customizing parameters into flash or any other types of memory of all the boards from time to time may be updated.
Secure Hashing without MAC Construction A key for changing a structure of the hashing scheme may be utilized. Such an approach may offer a few advantages before MAC construction. Firstly, the size of a used key may not be related to the size of a hash value. It may be possible to use the key of larger (or smaller) size than the size of a hash value. Secondly it may not be necessary to use a key every time when a message is hashed in the corresponding application. Once the inner structure of the hashing scheme is changed, a key may no longer be needed. The hash function with changed structure can be kept secret in such an embodiment.

This embodiment of the present invention, as a scheme may be effective in the case of hardware implementation of the algorithm.

A difference between MAC construction and the proposed scheme may be that in the case of a MAC construction a key may be utilized for "keying" a message, while in the embodiment of the present invention that applied hashing without MAC construction a key may be utilized for "keying" the structure of the hashing algorithm.

As the construction of the ERINDALE hash function disclosed herein can be complex it may be virtually computationally infeasible to determine or discover the inner (keyed) structure of the function based on even a large number of outputs.

The "ERINDALE-PLUS" Hash Function

In one embodiment of the present invention a construction of the polynomial based hash function may be applied. A main feature of the function, and a feature that differs this embodiment of the present invention from prior art and provides a benefit over prior art, consists in applying the splitting with jumping and the bit strings associated with the splitting and the iterated masking—along with a methodology of distributing the elements between the tables. The ERINDALE-PLUS is a customized and parameterized hash function that does not require a lot of memory.

Performing the splitting with jumping accelerates the speed of the algorithm, while considering the bit strings associated with the splitting with jumping and the iterated masking increases the security of the function as two new "time" dimensions are embedded into the construction of the function. There is one more very important new feature of the new function, namely the procedure of "filling" the tables. As the iterated masking of the degree greater than 0 is computed, the tables may be associated with the elements of $CUR^i(*)$ of different degrees. In the construction presented in the prior art, all the tables were associated with the elements from CUR of the same degree.

The function of the present invention may be implemented in a form of hardware or software.

Without loss of generality, it is possible to apply the direct and backward, or partial backward splitting presented above, though, in general, any number of splitting for a different n value can be contemplated. It may also be possible to apply splitting procedures for the same n value but with different jumping tables.

Let M be any sequence of bits. M may be preliminary padded and, on the other hand, it may be possible to choose the recursive consecutive padding I, or non-recursive consecutive padding. In this case the padding procedure will take place after processing M and forming the tables and the bit strings.

Multiple methods for padding a message M may be applied in embodiments of the present invention.

Denote by $n_d$ and $n_b$ the degrees of the polynomials for the direct and backward, or a partial backward splitting, respectively. Let, further $l_d$ and $l_b$ be the degree of the iterated masking for the direct and backward splitting, correspondingly. Prepare, then two collections of tables $Tb_i^d$ and $Tb_j^b$ for processing the corresponding elements of the direct and backward splitting, respectively, and denote by $Tb_i^d(x)$, $(Tb_j^b(x))$ the x-th entries of the corresponding tables for $i=0,\ldots,l_d$, $j=0,\ldots,l_b$. The tables $Tb_i^d$ will be related to the elements of $CUR^{n_d}$ of different degrees, $i=0,\ldots,l_d$, while tables $Tb_i^{n_b}$ will be associated to the elements of $CUR^{n_b}$ of different degrees. If, for example, $l_d=7$ and $l_b=15$, table $Tb_1^d$ will be related to the elements of $CUR^{n*_d}$, while table $Tb_3^b$ will be associated to the elements of $CUR^{n***_b}$, and so forth.

To each table generally two layers of bit strings are prepared. One layer contains the bit strings related to splitting with jumping, and the second layer is linked to the bit strings associated with the iterated masking. Denote by $Ls_i^d$, $Lm_i^d$ the layers of the bit strings related to splitting with jumping and the iterated masking, correspondingly, that are linked to tables $Tb_i^d$, $i=0,\ldots,l_d$. By analogy, the layers $Ls_j^b$ and $Lm_j^b$ of the bit strings related to splitting with jumping and the iterated masking, respectively, are linked to tables $Tb_i^b$, $i=0,\ldots,l_b$.

If splitting without jumping is invoked the layers $Ls_i^b$, $i=0,\ldots,l_d$ and $Ls_j^b$, $j=0,\ldots,l_b$ may all be empty.

The process of updating the bit strings from $Lm_i^d$, $Lm_i^b$ $i=0,\ldots,l_d$, $j=0,\ldots,l_b$ was described earlier (see section "The bit strings related to the iterated masking"). Another scheme that may be applied is that of processing the tables and the bit strings without detailing. This is analogous to the direct splitting as involved in backward splitting.

The tables and the corresponding bit strings may be processed, for instance, for $Tb_0^d$.

Firstly, all the entries of all the tables may be set to 0, and all the bits of all the bit strings have value 0.

Assume that we apply splitting with jumping, that is, layer $Ls_0^d$ is not empty. Based on one of the schemes described in GROUP I and GROUP II subsections of the section "Multiple splitting with jumping", it is possible to generate step-by-step a sequence $q_1,\ldots,q_k$ of integers for realizing the splitting with jumping, where k is a number of the elements of splitting.

In one embodiment of the present invention the calculation may commence by computing the elements of $CUR^d$ of degree 0. Let $CUR_1^d$ be the first element computed. It is then possible to increment by 1 the $Tb_0^d(int(CUR_1^d))$-th entry of table $Tb_0^d$ and, having prepared mapping $$\rho_0^d:(0,1,\ldots,2^{n_d}-1)\to Y_0^d,$$

to compute value $$\rho_0^d(int(CUR_1^d)).$$

Here $Y_0^d$ is a collection of random non-zero positive integers.

Based on the obtained value we update the corresponding bit string from layer $Lm_0^d$ as it was described earlier.

The bit strings may be updated from $Ls_0^d$. In fact, the procedure of updating the bit strings related to splitting with jumping was described in section "Splitting with jumping and the bit strings". A procedure of updating the bit string that was described in subsection "Scheme II" may be applied with a modified formula of calculating $\alpha$.

Prepare a mapping $$\alpha_0^d:\{0,\ldots,2^{n_d}-1\}\to\Delta_0^d,$$

where $\Delta_0^d$ is a set of non-zero integers, we compute $$\alpha_0^d(int(M_2 \oplus CUR_1^d))$$

and based on the value, update layer $Ls_0^d$ in accordance with the procedure, described in the section "Splitting with jumping and the bit strings", Scheme II.

It is possible to use $M_2$ as the generation of the elements of splitting, that is, elements $M_1, M_2, \ldots, M_k$ takes much less time than calculation of the elements of masking, that is, $CUR_1^d, CUR_2^d, \ldots, CUR_k^d$. Therefore it is possible to generate a block of elements of splitting for the time needed for calculation one element of the masking.

From now on, "update a layer $Lm_0^d$ (or $Ls_0^d$)", will mean "update the corresponding bit string from layer $Lm_0^d$ (or $Ls_0^d$)".

Let $CUR_2^d$ be the second element obtained in the process of computation. Again, it is possible to increment by 1 the $Tb_0^d(int(CUR_2^d))$-th entry of table $Tb_0^d$ and after computing $$\rho_0^d(int(CUR_2^d)).$$

update layer $Lm_0^d$. Then it is possible to calculate $$\alpha_0^d(int(M_3 \oplus CUR_2^d))$$

and update layer $Ls_0^d$.

On the i-th step of the calculation for $i \leq k$, having computed CURB it is possible to increment by 1 the $Tb_0^d(int(CUR_1^d))$-th entry of table $Tb_0^d$ and update layer $Lm_0^d$, based on $$\rho_0^d(int(CUR_1^d)).$$

Then it is possible to calculate $$\alpha_0^d(int(M_{i+1} \oplus CUR_i^d))$$

and update layer $Lm_0^d$.

Let $CUR_k^d$ be the last element of processing a message M. It is possible to increment by 1 the $Tb_0^d(int(CUR_k^d))$-th entry of table $Tb_0^d$ and update layer $Lm_0^d$ after computing $$\rho_0^d(int(CUR_k^d)).$$

At last it is possible to compute $$\alpha_0^d(int(M_1 \oplus CUR_k^d))$$

and update layer $Ls_0^d$.

Consider now, the iterated masking procedure of degree 1. Without losing generality just the case of the direct splitting may be examined.

Having prepared table $Tb_1^d$ and two layers $Lm_1^d$ and $Ls_1^d$ of the bit strings related to splitting with jumping and the iterated masking of degree 1, respectively, it is possible to generate a few elements of splitting and let $CUR_1^{d*}$ be the first element of masking of degree 1. The $Tb_1^d(int(CUR_1^{d*}))$-th entry of the
table may be incremented by 1 and the layer $Lm_1^d$ may be updated after computing $$\rho_1^d(int(CUR_1^{d*}))$$

for the prepared mapping $$\rho_1^d: \{0,1,\ldots,2^{n_d}-1\} \to Y_1^d.$$

In general, mapping $\rho_1^d$ is different from $\rho_1^d$. Then, having prepared mapping $$\alpha_1^d: \{0,1,\ldots,2^{n_d}-1\} \to \Delta_1^d,$$

it is possible to calculate $$\alpha_1^d(int(M_3 \oplus CUR_1^{d*}))$$

and update layer $Ls_1^d$.

On the i-th step of calculation for $i \leq k$, obtaining $CUR_i^{d*}$ the $Tb_1^d(int(CUR_i^{d*}))$-th entry of table $Tb_1^d$ may be incremented by 1 and computing $$\rho_1^d(int(M_3 \oplus CUR_i^{d*}))$$

update layer $Lm_1^d$.

Then it is possible to consider $$\alpha_1^d(int(M_{i+2} \oplus CUR_i^{d*}))$$

and update layer $Ls_1^d$.

To finish the description of the scheme it is possible to estimate the last two steps of the processing, namely, k−1 and k.

For $CUR_{k-1}^{d*}$ and $CUR_k^{d*}$ it is possible to increment two entries $$Tb_1^d(int(CUR_{k-1}^{d*}))$$

and $$Tb_1^d(int(CUR_{k-1}^{d*}))$$

of table $Tb_1^d$ and after computing $$\rho_1^d(int(CUR_{k-1}^{d*}))$$

and $$\rho_1^d(int(CUR_k^{d*}))$$

correspondingly, to update layer $Lm_1^d$ two times.

Finally, after calculating $$\alpha_1^d(int(M_{k+1} \oplus CUR_{k-1}^{d*}))$$

and $$\alpha_1^d(int(M_{k+2} \oplus CUR_k^{d*}))$$

it is possible to update layer $Ls_1^d$ two times.

By analogy, the iterated masking procedure of degree $l(*)$ and the calculation of the elements of $CUR^{d^{l(*)}}$ may be utilized to increment the corresponding entries of table $Tb_{l(*)}^d$ and, based on mapping $$\rho_{l(*)}^d: \{0,1,\ldots,2^{n_d}-1\} \to Y_{l(*)}^d,$$

update layer $Lm_{l(*)}^d$ step-by-step.

Keeping in mind the procedure of updating layer $Ls_{l(*)}^d$, it is possible to use a mapping $$\alpha_{l(*)}^d: \{0,\ldots,2^{n_d}-1\} \to \Delta_{l(*)}^d,$$

and then, update layer $Ls_{l(*)a}^d)$ based on the following sequence of integers $$\alpha_{l(*)}^d(int(M_{i+1} \oplus CUR_i^{d^{l(*)}})),$$

for $i=1, \ldots, k-l(*)-1$. Then it is possible to calculate $l(*)+1$ remaining elements in accordance with $$\alpha_{l(*)}^d(int(M_{i+1} \oplus CUR_{k-l(*)+i}^{d^{l(*)}}))$$

where $i=0, \ldots, l(*)$ and perform the last $l(*)+1$ steps of updating $Ls_{l(*)}^d$. Similarly, all the tables and the two layers of bit strings for the backward splitting may be processed.

Now processing of already prepared tables and the bit strings may proceed. It may be assumed that the padding procedure has been previously applied.

Assuming that splitting with jumping is available it is possible to start processing layers $Ls_i^d$ and $Ls_j^b$, $i=0, \ldots, 1_d$, $j=0, \ldots, 1_b$.

It is possible to calculate $$BSJ^d(i) = \sum_{x \in \Xi_i} (x+1) \text{int}(\varepsilon_{ix}^d)$$

and $$BSJ^b(j) = \sum_{y \in \Xi_j} (y+1) \text{int}(\varepsilon_{jy}^b)$$

for $i=0, \ldots, 1_d$ and $j=0, \ldots, 1_b$. Here $\epsilon_{ix}^b$ and $\epsilon_{jy}^b$ are the bit strings for the corresponding i, j, x and y that were obtained after completing the direct and backward processes, correspondingly.

It is also possible to compute $$BST^d(i) = \sum_{x \in W_i^d} (x+1) \text{int}(v_{ix}^d)$$

and $$BST^b(j) = \sum_{x \in W_j^b} (x+1) \text{int}(v_{jx}^b)$$

for the bit strings from layers $Lm_i^b$ and $Lm_j^b$, respectively, $i=0, \ldots, 1_d$ and $j=0, \ldots, 1_b$.

Next, applying the factorization procedure to tables $Tb_i^d$ and $Tb_j^b$, let $J(n)$ be the lexicographically ordered set of all irreducible polynomials of degree less than n with the coefficients from $F_2$ and denote by irr(n) the cardinality of J(n). Thus, J(4) is the following ordered set:

$$\{0, 1, x, x+1, x^2+x+1, x^3+x+1, x^3+x^2+1\}.$$

Denote by $FC_n(h, i)$ the multiplicity of the i-th irreducible polynomial in the factorization of $h \in F_2^n$. For instance, the result may be $$FC_4(x^2+x, 1)=0, FC_4(x^2+x, 4)=1, FC_4(x^3+x^2, 3)=2.$$

For each table $Tb_i^d$ and $Tb_j^d$ prepare one more table $Tbf_i^d$ and $Tbf_j^b$, $i=0, \ldots, 1_d$, and $j=0, \ldots, 1_b$. Any table $Tbf_i^d$ contains irr($n_d$) entries, while any table $Tbf_j^b$ contains irr($n_b$) entries, $i=0, \ldots, 1_d$, $j=0, \ldots, 1_b$.

For instance, if $n_d=4$ and $n_b=5$ then irr(4)=7 and irr(5)=10. Therefore any table $Tbf_i^d$ and $Tbf_j^b$ for $i=0, \ldots, 1_d$ and $j=0, \ldots, 1_b$ contains 7 and 10 entries, correspondingly.

Before processing the factorization procedure all the entries of the tables $Tbf_i^d$ and $Tbf_j^b$ are set to 0, $i=0, \ldots, 1_d$ and $j=0, \ldots, 1_b$.

Then calculate the values of the entries of the new tables in accordance with $$Tbf_i^d(t) = \sum_{j=1}^{2^{n_d}} Tb_i^d(j) * FC_{n_d}(pol(j-1), t) \qquad (29)$$

$t=1, \ldots, irr(n_d)$, $i=0, \ldots, 1_d$. Here $pol(j-1)$, $j=1, \ldots, 2^{n_d}$ is a polynomial presentation (with coefficients from $F_2$) of the corresponding integers written in a binary form. For example, pol(3)=x+1, pol(9)=$x^3$+1 and so forth. Moreover, $Tb_i^d(j)$ and $Tbf_i^d(t)$ are the values of the j-th and t-th entries of tables, $Tb_i^d$ and $Tbf_i^d$, correspondingly, $i=0, \ldots, 1_d$.

By analogy $$Tbf_i^d(t) = \sum_{j=1}^{2^{n_d}} Tb_i^d(j) * FC_{n_d}(pol(j-1), t) \qquad (30)$$

$t = 1, \ldots, irr(n_b)$, $i = 0, \ldots, 1_b$.

After computing the entries of the tables $Tbf_i^d$ and $Tbf_j^b$ it may be possible to enumerate the entries in accordance with the known procedures described in the prior art.

Thus, obtaining integers $E_i^d$ and $E_j^b$, $i=0, \ldots, 1_d, j=0, \ldots, 1_b$, it may be possible eventually to compute $V^d$ and $V^b$ by $$V^d = E_0^d + BST_0^d + BSJ_0^d + 2(E_1^d + BST_1^d + BSJ_1^d) + \ldots + (1_d+1)(E_{1_d}^d + BST_{1_d}^d + BSJ_{1_d}^d). \qquad (31)$$

and $$V^b = E_0^b + BST_0^b + BSJ_0^b + 2(E_1^b + BST_1^b + BSJ_1^b) + \ldots + (1_b+1)(E_{1_d}^b + BST_{1_d}^b + BSJ_{1_d}^b). \qquad (32).$$

Finally it is possible to compute $$V = n_d V^d + n_b V^b,$$

based on which the final hash value may be calculated in accordance with the procedure of the prior art.

Padding Procedure and the Final Hash Value Calculation Procedure

One or more methods of computing the final hash value based on the processed bit strings and the tables may be applied in embodiments of the present invention, as may methods of padding.

In the present invention, it may be possible to let $Tbf_i^d(t)$ and $Tbf_i^b(z)$ be the entries of the tables obtained during the procedure of processing a message, where $t=1, \ldots, irr(n_d)$, $z=1, \ldots, irr(n_b)$ $i=0, \ldots, 1_d$ and $j=0, \ldots, 1_b$. Based on the values of the tables it may be possible to form a sequence of bits for padding that may be further processed before or after the recursive consecutive padding I, or non-recursive consecutive padding.

Denote by bin(x) a binary presentation of an integer x.

It may be possible to generate a sequence of bits $Pad_b$ that will be a padding message for backward or a partial backward processing $$Pad_d = bin(Tbf_0^d(1)) \| bin(Tbf_0^d(2)) \| \ldots \| bin(Tbf_0^d(irr(n_d))) \| bin(Tbf_1^d(1)) \| bin(Tbf_1^d(2)) \| \ldots \| bin(Tbf_1^d(irr(n_d))) \|$$

$\ldots$ $$bin(Tbf_{1_d}^d(1)) \| bin(Tbf_{1_d}^d(2)) \| \ldots \| bin(Tbf_{1_d}^d(irr(n_d))).$$

Here $\|$ is an operation of concatenation of binary strings.

Now it may be possible to generate a padding message $Pad_d$ for the direct processing, for example, in accordance with $$Pad_d = bin(Tbf_0^b(1)) \| bin(Tbf_1^b(1)) \| \ldots \| bin(Tbf_{1_b}^b(1)) \| bin(Tbf_0^b(2)) \| bin(Tbf_1^b(2)) \| \ldots \| bin(Tbf_{1_b}^b(2)) \|$$

$\ldots$ $$bin(Tbf_0^b(irr(n_b))) \| bin(Tbf_1^b(irr(n_b))) \| \ldots \| bin(Tbf_{1_b}^b(irr(n_b))).$$

In one embodiment of the present invention it may be possible to modify the procedures of forming bit sequences $Pad_d$ and $Pad_b$.

It may be possible to apply a key or a part of a key to change the order of the entries from the tables. It may also be possible to use a customization parameter (or a part of it) for defining the order of the entries of the tables for forming $Pad_d$ and $Pad_b$.

After the padding messages are generated, they may be processed and after finishing the padding a consideration of the process of calculating the bit strings may be initiated.

A method of computing the final hash value just for layers $Ls_i^d$ and $i=0, \ldots, l_d$, may be applied. Methods for computing the final hash value for other layers may incorporate similar or analogous procedures.

In general for software and hardware implementations it may be more convenient to set the lengths of the bit strings divisible by 8. In one embodiment of the present invention it may be assumed that the lengths of all the bit strings are divisible by 8.

It may be possible to denote by $sub_{1x}^8(\epsilon_{ix}^d)$ the sequence of bits containing the first 8 bits of bit string $\epsilon_{ix}^d$, then by $sub_{2x}^8(\epsilon_{ix}^d)$ the second 8 bits of bit string $\epsilon_{ix}^d$, $x \in \Xi_i$, $i=0, \ldots, l_d$ and so forth. For any fixed i and $x \in \Xi_i$ we have $$\epsilon_{ix}^d = sub_{1x}^8(\epsilon_{ix}^d) \| sub_{2x}^8(\epsilon_{ix}^d) \| \ldots \| sub_{t_ix}^8(\epsilon_{ix}^d),$$

where $\tau_i * 8 = len(\epsilon_{ix}^d)$, $len(\epsilon_{ix}^d)$ is the length of $\epsilon_{ix}^d$.

It may be possible to also assume that the lengths of all $(\epsilon_{ix}^d)$ for $x \in \Xi_i$ within considered layer i are equal. It may then be possible to compute $$val_{jx}^d = (int(sub_{jx}^8(\epsilon_{ix}^d)) * x) \bmod 256,$$

$j=1, \ldots, t_i$, $i=0, \ldots, l_d$, $x \in \Xi_i$.

It may also be possible to compute val in accordance with $$val_{jx}^i = (int(sub_{jx}^8(\epsilon_{ix}^d)) + x) \bmod 256,$$

$j=1, \ldots, t_i$, $i=0, \ldots, l_d$, $x \in \Xi_i$. Any operation that involves $int(sub_{jx}^8(\epsilon_{ix}^d))$ and x by mod 256 may be considered here.

Next it may be possible to calculate $$h_{i1} = g_{x_1}^{(val_{1x_1}^i)} \oplus g_{x_2}^{(val_{1x_2}^i)} \oplus \ldots \oplus g_{x_{d_i}}^{(val_{1x_{d_i}}^i)},$$

then $$h_{i2} = g_{x_1}^{(val_{2x_1}^i)} \oplus g_{x_2}^{(val_{2x_2}^i)} \oplus \ldots \oplus g_{x_{d_i}}^{(val_{2x_{d_i}}^i)},$$

...

$$h_{it_i} = g_{x_1}^{(val_{t_ix_1}^i)} \oplus g_{x_2}^{(val_{t_ix_2}^i)} \oplus \ldots \oplus g_{x_{d_i}}^{(val_{t_ix_{d_i}}^i)},$$

where $\Xi_i = \{x_1, \ldots, x_{d_i}\}$, and $g_{x_1}, g_{x_2}, \ldots$, are different generators of $GF(2^8)^*$, $i=0, \ldots, l_d$ and $\oplus$ is an operation of addition in $GF(2^8)$.

Consider now the situation when the lengths of all bit strings for all layers $Ls_i^d$, $i=0, \ldots, l_d$ are equal to $t*8$ for some $t>0$. Assume again that the lengths of all the bit strings within all $Ls_i^d$, $i=0, \ldots, l_d$ are equal.

It may be possible next to compute $$sh_1 = f_1^{int(h_{11})} \oplus f_2^{int(h_{21})} \oplus \ldots \oplus f_{l_d}^{int(h_{l_d1})},$$

$$sh_2 = f_1^{int(h_{12})} \oplus f_2^{int(h_{22})} \oplus \ldots \oplus f_{l_d}^{int(h_{l_d2})},$$

...

$$sh_t = f_1^{int(h_{1t})} \oplus f_2^{int(h_{2t})} \oplus \ldots \oplus f_{l_d}^{int(h_{l_dt})},$$

where $f_1, f_{l_d}$ are different generators of $GF(2^8)^*$.

By analogy it may be possible to compute values $mh_1, \ldots, mh_p$ for layers $Lm_i^d$, where $p*8$ is the length of all the bit strings from $Lm_i^d$, $i=0, \ldots, l_d$. In general p and t are different.

The same calculations may be provided for backward layers $Ls_j^b$ and $Lm_j^b$, $j=0, \ldots, l_b$ and as the result of the calculations it may be possible to obtain collections of elements from $GF(2^8)$ $$bsh_1, bsh_2, \ldots, bsh_{bt} \text{ and } bmh_1, bmh_2, \ldots, bmh_{bp},$$

where $bt*8$ and $bp*8$ are the lengths of the corresponding bit strings. It is possible that p, t, bp and bt may be all different.

A procedure may be applied to generate q elements from $GF(2^8)$ (or from any other finite field $GF(2^n)$) based on two collections of elements from $GF(2^8)$ (or from any other finite field $GF(2^n)$)

$$a_1, a_2, \ldots, a_n \text{ and } b_1, b_2, \ldots, b_m$$

for different n, m>0 such that n>q and m>q, but n<2q and m<2q.

Present collection $a_1, a_2, \ldots, a_n$ as $a_1, a_2, \ldots, a_q, c_1, \ldots, c_s$, where $$c_1 = a_{q+1}, c_2 = a_{q+2}, \ldots, c_s = a_n.$$

In a similar way present collection $b_1, b_2, \ldots, b_m$ as $d_1, d_2, \ldots, d_l, b_{m-q+1}, \ldots, b_m$, where $$d_1 = b_1, d_2 = b_2, \ldots, d_l = b_l.$$

There may be exactly q elements in collection $b_{m-q+1}, \ldots, b_m$ and $s < q$, $l < q$.

It may be possible to compute $$e_1 = g^{(int(a_1 \oplus d_l))}$$

$$e_2 = g^{(int(a_2 \oplus d_{l-1}))} \oplus e_1,$$

$$e_3 = g^{(int(a_3 \oplus d_{l-2}))} \oplus e_2,$$

...

$$e_l = g^{(int(a_l \oplus d_1))} \oplus e_{l-1},$$

$$e_{l+1} = g^{(int(a_{l+1}))} \oplus e_l,$$

...

$$e_q = g^{(int(a_q))} \oplus e_{q-1},$$

where g is a generator of $GF(2^8)^*$ (or from a group $GF(2^n)^*$ related to any other finite field $GF(2^n)$).

It may be possible further to calculate $$h_1 = f^{(b_m \oplus c_1)},$$

$$h_2 = f^{(b_{m-1} \oplus c_2)} \oplus h_1,$$

$$h_3 = f^{(b_{m-2} \oplus c_3)} \oplus h_2,$$

...

$$h_s = f^{(b_{m-s} \oplus c_s)} \oplus h_{s-1},$$

$$h_{s+1} = f^{(b_{m-s-1})} \oplus h_s,$$

...

$$h_q = f^{(b_{m-q+1})} \oplus h_{q-1}.$$

Here f is a generator of $GF(2^8)^*$ (or from a group $GF(2^n)^*$ related to any other finite field $GF(2^n)$) which is different from g.

As another step it may be possible to calculate the desired q elements $$e_1 \oplus h_1 e_1 \oplus h_1, \ldots, e_q \oplus h_q.$$

The procedure will be referenced to as the iterated q-generation procedure.

It is possible that s can be equal to 0, or l can be equal to 0. In this case in the iterated q-generation procedure it may be possible not to use the elements $c_1, \ldots, c_s$, or $d_1, d_2, \ldots, d_l$, respectively.

Having the iterated q-generation procedure, it may be possible to remove the assumptions referenced previously, namely, that the bit strings have the same length in a framework of one layer and even in a framework of all layers Ls and Lm.

Indeed, it may be enough to find the bit string with the minimal length $l_{min}$ inside of each layer and start applying step by step the iterated $l_{min}$-generation procedure with all the bit strings starting from the first two. After obtaining one sequence of the corresponding elements of GF ($2^8$) in every layer, it may be possible to find the sequence containing the minimal number of the elements, which we denote by $f_{min}$, and again starting from the first two layers step by step apply the iterated $f_{min}$-generation procedure. In the result of the processing it may be possible to obtain a sequence of the corresponding elements from GF($2^8$) containing $f_{min}$ elements.

There may be four collections of the elements from GF($2^8$) that may be obtained as the result of either applying the above described procedure or the corresponding iterated q-generation procedures. That is, it may be possible to have $$sh_1, \ldots, sh_t, mh_1, \ldots, mh_p$$

and $$bsh_1, bsh_2, \ldots, bsh_{bt}, bmh_1, bmh_2, \ldots, bmh_{bp}.$$

Denote $n_1 = \min\{t, bp\}$ and $n_2 = \min\{p, bt\}$. Assume that $2n_1 > t$, $2n_1 > bp$, $2n_2 > p$ and $2n_2 > bt$.

It may be possible to apply the procedure of the iterated $n_1$-generation to collections $sh_1, \ldots, sh_t$ and $bmh_1, bmh_2, \ldots, bmh_{bp}$. As the result it may be possible to obtain a collection of elements from GF($2^8$) containing $n_1$ elements. The procedure of the iterated $n_2$-generation may then be applied to collections $mh_1, \ldots, mh_p$ and $bsh_1, bsh_2, \ldots, bsh_{bt}$. The result may be the corresponding collection of $n_2$ elements from GF($2^8$). Denote the collections by $F_i$, $i=1, \ldots, n_1$ and $V_j$, $j=1, \ldots, n_2$.

Let $\tau$ be a size of a hash value that needs to be generated. It may be possible to set from the beginning the lengths of the bit strings in such a way that $2\tau > n_1$, $2\tau > n_2$. Eventually the iterated $\tau$-generation procedure may be applied to the collections $F_i$, $i=1, \ldots, n_1$ and $V_j$, $j=1, \ldots, n_2$ and the final hash value $h_\tau$ may be derived.

It may not be necessarily always to present the bit strings as the collection of elements of GF($2^8$). For instance it may be possible to use GF($2^4$), or even GF($2^2$). If the length of a bit string is divisible by any $a > 1$, it may be possible to use GF($2^a$)

In one embodiment of the present invention, the number of tables prepared for both direct and backward (or a partial backward) splitting may be different. For example, it may be possible to prepare just one table for direct and one table for backward processes. One or more tables may be generated just for the direct (backward) procedure. In this case, for instance, based on the tables, the corresponding padding message may be prepared just for backward (direct) processing, while a padding message for direct (backward) processing may be prepared in accordance with recursive or non-recursive consecutive padding procedure.

In one embodiment of the present invention it may be possible to reserve up to $l_d+1$ layers $Lm^d$ and up to $l_d+1$ layers $Ls^d$ of the bit strings for the table associated to the direct processing. By analogy, up to $l_b+1$ layers $Lm^b$ and up to $l_b+1$ layers $Ls^b$ of the bit strings may be reserved for the table associated to the backward processing. It is also possible to increment the corresponding entries of both tables based on the elements of $CUR_a^d$ (and $CUR_c^b$), where $a \leq l_d$ (and $b \leq l_b$).

On the other hand, the list of the bit strings within the layers related to jumping and the list of the bit strings within the layers related to the iterated masking for both tables can be used as the parameter of customization. For example, let $l_d = 37$ and $l_b = 42$. In this case it is possible to use a parameter (a bit sequence) of size $74 + 86 = 160$ as a customization parameter. Indeed, the first 74 bits of the customizing bit sequence are linked to the first table, that is, to the direct splitting. Specifically, the first 37 bits define the list of the bit strings of the layers related to splitting with jumping, while the next 37 bits customize the list of the bit strings within the layers related to the iterated masking. The customization procedure for the table associated to the direct splitting may be defined as follows. If, the i-th bit of the customization parameter is 0, it is not necessary to create the layer related to jumping for $CUR^d$ of degree $i-1$, if $i=1, \ldots, l_d+1$, otherwise it is possible to embed the corresponding bit string associated to $CUR^d$ of the iterated degree $i-1$. Then if the i-th bit of the parameter is 0 for $i = l_d+2, \ldots, 2l_d+2$ it is not necessary to create the bit strings within the layer related to the iterated masking for $CUR^d$ of degree $i - l_d - 2$, otherwise the corresponding bit strings will be built.

The same consideration may be applied to the remaining bits of the parameter. For example, it is possible to just work with the corresponding layers for the table associated to the backward splitting.

Finally, the number of the tables may be greater than two and less than $l_d + l_b + 2$.

In this case many possibilities may be available to distribute the layers $Lm_i^d$ and $Ls_i^d$, $i = 0, \ldots, l_d$ between the tables associated to the direct splitting.

By analogy, it may be possible to distribute layers $Lm_j^b$ and $Ls_j^b$, $j = 0, \ldots, l_b$ between the tables associated with the backward splitting in different ways as well.

The ERINDALE-PLUS algorithm may provide a means for realizing secure hashing without MAC construction. The example of customizing the function disclosed above may be transferred to the building the scheme of secure hashing. Generally, various parameters of the function may be keyed, such as, for example: a collection of indices, for which the bit strings are generated; the lengths of the bit strings; the order of the entries of the tables during the procedure of forming $Pad_d$ and $Pad_b$; and the order of processing the bit strings in the situation when the iterated q-generation procedure is applied.

The Digital Signature Algorithms Based on a Customized Hash Function

A digital signature is a method of authenticating any digital information. As an output of an applied digital signature algorithm may be one or more binary strings that provide authenticity, integrity and non-repudiation of the transmitted message.

Known digital signature algorithms are generally based on a public key cryptography and consist of two parts—a signing algorithm and a verification algorithm. Known digital signature algorithms usually employ a hash (or MAC) value of a file.

In one embodiment of the present invention the ERINDALE-PLUS hash function is applied. Before generating a digital signature for a file it is necessary to hash the file with a certain customization parameter. After generating the digital signature a receiver should be alerted that a certain customization parameter was used to compute a hash value, based on which the digital signature was calculated.

In another embodiment of the present invention, a customization parameter may be stored in a public directory. This storage of the customization parameter in a public directory may occur when a sender hashes a file. At this point the user applies the customization parameter from the directory for setting the corresponding inner structure of the hashing algorithm. Then a sender using a private key, the generated hash value, and information from a public directory may compute a digital signature. Thus after obtaining the file with the attached signature, a receiver may hash the file using the customization parameter from a public directory and then accept or reject the message based on the result of the verification algorithm.

Embodiments of the invention may be represented as a software product stored in a machine readable medium (also referred to as a computer-readable medium, a processor-readable medium, or a computer usable medium having a computer readable program code embodied therein). The machine readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

As one example, the method of the present invention can be readily implemented in a Dynamically Linked Library or DLL which is linked to a computer program that utilizes an algorithm that embodies the hash function, MAC function or ERINDALE-PLUS function described above, for example, an encryption, decryption or authentication utility that is operable to apply said algorithm.

The computer program of the present invention is therefore best understood as a computer program that includes computer instructions operable to implement an operation consisting of the calculation of the hash value or secure hash value as described above.

Another aspect of the present invention is a computer system that is linked to a computer program that is operable to implement on the computer system the transformation of a MAC-value, in accordance with the present invention.

This invention will be of use in any environment where hash functions, MAC functions and ERINDALE-PLUS functions may be used for data integrity or authentication (digital signatures being an example).

An example is secure email. Several widely used systems for secure email (such as PGP and S/MIME) use SHA-1 as the hash algorithm.

As another example, the method of the present invention can be readily implemented in a specially constructed hardware device. Such a hardware implementation of the present invention may enable a dramatic increase in the speed of hashing, as all the hardware implementations of stream algorithms are usually much faster than the corresponding software implementations. In particular, one embodiment may apply one-chip hardware configuration.

The aspects of the present invention and embodiments thereof presented lend the invention to several applications. For example, the present invention may be applied to an online environment wherein digital signatures are routinely applied, for the purpose of ensuring the security of data passed between users. This use has practical applicability in several markets regarding the flow of electronic information, such as banking, legal, other professional businesses and trades, as well as within the public sector in government, universities, hospitals and other institutions. In these environments information is passed regularly between members by way of the Internet, Intranets and internal networks. Furthermore, as the speed of the hash function may be significantly increased when the invention is implemented by way of hardware, in such an implementation it may be possible to apply the invention to the flow of confidential information by way of methods requiring fast processing, such as video-conferencing. For example, organizations such as the military require secure and fast means of telecommunication to permit the passing of confidential information between members located distant from one another. The speed of the hash function can be very high in hardware implementations, for example, up to 3.4 giga-bits/second (FPGA V, ~400 MHz), therefore, such an implementation may provide a utile means of supporting private video-conferencing and protecting the confidential of nature of information passed therein. Furthermore, online implementations of the present invention can utilize existing signal processing providers, such as telecommunications companies like as Bell Canada™ or Rogers™, as well as private networks, to facilitate transmissions.

The above-described embodiments of the present invention are intended to be examples only. Alterations, modifications and variations may be effected to the particular embodiments by those of skill in the art without departing from the scope of the invention, which is defined solely by the claims appended hereto.

It will be appreciated by those skilled in the art that other variations of the embodiments described herein may also be practiced without departing from the scope of the invention. Other modifications are therefore possible.

The invention claimed is:

1. A system directed at hash functions capable of averting attacks upon hash values of messages comprising:
   at least one hardware;
   a message sent by a sender by way of the at least one hardware;
   a polynomial-based hashing function being operable by the at least one hardware for application to the message to produce a hash output, comprising:
      a multiple splitting with jumping procedure characterized in that for the preliminary chosen by a customer $4 \leq n \leq 10$ a q-jumping splitting procedure for $0 < q < n$ is applied, where q is computed by the methods chosen from the group consisting of Group I and Group II, wherein splitting is dependent on initial mappings;
      an iterated masking procedure generating elements of a CUR, and wherein elements of the CUR depend on elements of another CUR of the same, lower or higher degrees;
      a bit strings generation procedure having randomness;
      a padding procedure wherein the sequence depends on an initial hashed message; and,
      a final hash value generation procedure;

a number of splitting with jumping procedures are applied, wherein the number is defined by a customer as an initial value; and, each applied splitting with jumping procedure is chosen from the group consisting of: direct q-splitting; and, partial backward splitting, wherein the length of the portion of the partial backward splitting is preliminarily chosen by a customer as an initial value.

2. The system of claim 1 wherein the padding procedure is chosen from the group consisting of:
a recursive consecutive padding;
a non-recursive consecutive padding; and,
a padding procedure based on the entries of tables.

3. The system of claim 1 wherein the final hash value generation procedure is an iterated q-generation procedure.

4. The system of claim 1, wherein an implementation of the hashing function is chosen from the group consisting of: hardware; and, software implemented on a computer.

5. The system of claim 1, wherein the polynomial-based hashing function incorporates an ERINDALE-PLUS hashing function.

6. The system of claim 1, wherein:
the speed, security and the size of a generated hash value of the polynomial-based hashing function are parameterized; and,
the parameterization is achieved by adjusting a splitting with jumping procedure; a number of layers of the bit strings generated for each table; the size of bit strings within each layer; and, by varying parameters of an iterated q-generation procedure.

7. The system of claim 1, wherein bit strings generated by the bit string generation procedure are multi-layered, the layers of the bit strings are formed from the bit strings related to the iterated masking and the bit strings related to splitting with jumping.

8. The system of claim 1, wherein the polynomial based hash function is customized by varying:
the number and sizes of the bit strings within each layer;
the number of layers of the bit strings associated to each table;
a method of realizing a splitting with jumping procedure; and,
parameters of an iterated q-generation procedure.

9. The system of claim 1, wherein the size of a generated hash value is determined by the range of the sizes of the bit strings.

10. The system of claim 1 wherein:
a number of the applied iterated masking procedures corresponds to the number of performed splitting with jumping procedures;
each applied iterated masking procedure uses a processing function chosen from the group consisting of: CUR calculation I and CUR calculation II procedures; and,
the highest degree of each applied iterated masking procedure is chosen by a customer as an initial value.

11. A method of a polynomial-based hash function applied to a message, comprising the following steps:
(A) calculating a hash output utilizing the polynomial-based hash function comprising the following steps:
(1) a hardware applying to the message a number of multiple splitting with jumping procedures wherein the multiple splitting with jumping procedure is characterized in that for the preliminary chosen by a customer $4 \leq n \leq 10$ a q-jumping splitting procedure for $0 < q < n$ is applied, where q is computed by the methods chosen from the group consisting of Group I and Group II;

a number of splitting with jumping procedures are applied, wherein the number is defined by a customer as an initial value; and, each applied splitting with jumping procedure is chosen from the group consisting of direct q-splitting and partial backward splitting, wherein the length of the portion of the partial backward splitting is preliminarily chosen by a customer as an initial value;

(2) the hardware applying a number of iterated masking procedures to the splitting with jumping outputs generating elements of a CUR wherein the elements of a CUR depend on elements of a CUR of the same, lower and higher degrees; wherein the number corresponds to the number of applied splitting with jumping procedures; and each applied iterated masking procedure chosen from the group consisting of CUR calculation I and CUR calculation II procedures;

(3) the hardware applying a bit string generation procedure having randomness to the masking outputs and to the multiple splitting with jumping outputs to generate bit strings outputs, (4) the hardware generating padding outputs by applying a padding procedure to the masking outputs and to the bit strings outputs, and said padding procedure is chosen from the group consisting of:
(a) a recursive consecutive padding procedure;
(b) a non-recursive consecutive padding procedure; and
(c) a padding procedure based on using entries of tables for forming a padding sequence of bits;

(5) the hardware processing the padding outputs to generate a hash value by applying an iterated q-generation procedure;

(B) using a calculated final hash value for checking integrity of the message wherein the message is hashed by transforming bit values of the message within memory of the hardware.

12. The method of claim 11, wherein the polynomial-based hashing function incorporates an ERINDALE-PLUS hashing function.

13. The method of claim 11, wherein the speed, security and the size of a generated hash value of the polynomial-based hashing function are parameterized, the parameterization is achieved by adjusting a splitting with jumping procedure; a number of layers of the bit strings generated for each table, and the size of bit strings within each layer.

14. The method of claim 11, wherein the size of a generated hash value is determined by the range of the sizes of the bit strings.

15. The method of claim 11, wherein bit strings generated by the bit string generation procedure are multi-layered, the layers of the bit strings are formed from the bit strings related to the iterated masking and the bit strings related to jumping.

16. The method of claim 11, wherein the polynomial based hash function is customized by varying the number of layers of the bit strings associated to each table, by varying the number and sizes of the bit strings within each layer, by varying a method of realizing a multiple splitting with jumping procedure and by varying the method of generating the elements of the iterated masking procedure.

17. The method of claim 11 further comprising the step of generating bit strings outputs and final bit strings outputs that are one or more of the following:
one or more bit strings; or
one or more tables.

18. A method of use for verifying integrity of a message, the method comprising the steps of:

(A) receiving a message sent by a sender;
(B) a hardware applying a polynomial-based hashing function to the message to produce a hash output utilizing the following elements:
- (1) a multiple splitting with jumping procedure, wherein splitting is dependent on initial mappings wherein the multiple splitting with jumping procedure is characterized in that for the preliminary chosen by a customer $4 \leq n \leq 10$ a q-jumping splitting procedure for $0<q<n$ is applied, where q is computed by the methods chosen from the group consisting of Group I and Group II;
    a number of splitting with jumping procedures are applied, wherein the number is defined by a customer as an initial value; and,
    each applied splitting with jumping procedure is chosen from the group consisting of direct q-splitting and partial backward splitting, wherein the length of the portion of the partial backward splitting is preliminarily chosen by a customer as an initial value;
- (2) an iterated masking procedure generating elements of a CUR, wherein elements of the CUR depend on elements of another CUR of the same, lower or higher degrees;
- (3) a bit string generation procedure having randomness, the procedure generating multi-layered bit strings, the layers of the bit strings are formed from the bit strings related to the iterated masking and the bit strings related to splitting with jumping;
- (4) a padding procedure wherein the sequence depends on an initial hashed message; and,
- (5) a final hash value generation procedure;
(C) the hardware processing the hash output by one or more processing functions operable to generate an output; and,
(D) the hardware comparing the hash output with a hash calculation of an original message to determine whether the message has been altered.

19. The system of claim 1, wherein the hardware is selected from the group consisting of a computer, one or more FPGA chips, and one or more ASIC chips.

20. The method of claim 11, wherein the hardware is selected from the group consisting of a computer, one or more FPGA chips, and one or more ASIC chips.

21. The method of claim 18, wherein the hardware is selected from the group consisting of a computer, one or more FPGA chips, and one or more ASIC chips.

* * * * *